United States Patent
Weber

(10) Patent No.: US 9,510,309 B2
(45) Date of Patent: Nov. 29, 2016

(54) CODEC INVERSION DETECTION

(71) Applicant: QUALCOMM Incorporated, San Diego, CA (US)

(72) Inventor: Ralf Martin Weber, Uttenreuth-Weiher (DE)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/711,621

(22) Filed: May 13, 2015

(65) Prior Publication Data

US 2015/0334668 A1 Nov. 19, 2015

Related U.S. Application Data

(60) Provisional application No. 61/993,000, filed on May 14, 2014.

(51) Int. Cl.
*H04M 11/04* (2006.01)
*H04W 56/00* (2009.01)
(Continued)

(52) U.S. Cl.
CPC ........... *H04W 56/003* (2013.01); *H04M 11/04* (2013.01); *H04M 11/045* (2013.01); *H04M 11/06* (2013.01); *H04W 4/22* (2013.01); *H04W 56/001* (2013.01); *H04W 76/007* (2013.01)

(58) Field of Classification Search
CPC . H04W 56/003; H04W 56/001; H04W 4/22; H04W 76/007; H04M 11/04; H04M 11/06; H04M 11/045
USPC ............ 455/404.1, 404.2, 412.2, 414.1, 424; 379/37, 38, 40, 45, 51
See application file for complete search history.

(56) References Cited

U.S. PATENT DOCUMENTS 6,047,254 A * 4/2000 Ireton ..................... G10L 19/08
704/207
8,503,517 B2 8/2013 Huang et al.
(Continued)

FOREIGN PATENT DOCUMENTS

WO 2009149346 A1 12/2009
WO 2010148151 A1 12/2010

OTHER PUBLICATIONS

"ETSI TS 126 267 V11.0.0 Technical Specification," Global System for Mobile Communications, Oct. 2012, European Telecommunications Standards Institute, Sophia Antipolis, France, pp. 1-37.
(Continued)

*Primary Examiner* — Khai M Nguyen
(74) *Attorney, Agent, or Firm* — Toler Law Group, PC

(57) ABSTRACT

A device includes a receiver and a processor. The receiver is configured to receive a signal. The processor is configured to generate a first flag indicating whether the signal satisfies one or more first conditions that are based on a number of detected correlation peaks associated with the signal, a correlation peak amplitude, or both, and to generate a second flag indicating whether an inverted signal satisfies one or more second conditions. The processor is further configured to generate a first value of a first synchronization sign indicator associated with the signal and to generate a second value of a second synchronization sign indicator associated with the inverted signal. The processor is also configured to generate an invert flag that indicates whether synchronization inversion is detected in the signal based at least in part on the first flag, the second flag, the first value, and the second value.

40 Claims, 11 Drawing Sheets

(51) Int. Cl.
*H04W 4/22* (2009.01)
*H04W 76/00* (2009.01)
*H04M 11/06* (2006.01)

(56) References Cited

U.S. PATENT DOCUMENTS

| | | | | |
|---|---|---|---|---|
| 2009/0306974 A1* | 12/2009 | Huang | ............... | H04L 5/1415 |
| | | | | 704/211 |
| 2009/0306976 A1* | 12/2009 | Joetten | ............... | H04L 5/1415 |
| | | | | 704/214 |
| 2011/0142030 A1* | 6/2011 | Pietsch | ............... | H04L 1/16 |
| | | | | 370/350 |
| 2011/0149847 A1* | 6/2011 | Pietsch | ............... | H04L 1/16 |
| | | | | 370/328 |
| 2015/0022263 A1* | 1/2015 | Kamata | ............... | H04L 27/22 |
| | | | | 329/327 |

OTHER PUBLICATIONS

"ETSI TS 126 267 V12.0.0 Technical Specification," Global System for Mobile Communications, Oct. 2014, European Telecommunications Standards Institute, Sophia Antipolis, France, pp. 1-37.

"ETSI TS 126 268 V11.0.0 Technical Specification," Global System for Mobile Communications, Oct. 2012, European Telecommunications Standards Institute, Sophia Antipolis, France, pp. 1-28.

"ETSI TS 126 268 V12.0.0 Technical Specification," Global System for Mobile Communications, Oct. 2014, European Telecommunications Standards Institute, Sophia Antipolis, France, pp. 1-28.

"ETSI TS 126 269 V11.0.0 Technical Specification," Global System for Mobile Communications, Oct. 2012, European Telecommunications Standards Institute, Sophia Antipolis, France, pp. 1-18.

"ETSI TS 126 967 V11.0.0 Technical Specification," Global System for Mobile Communications, Oct. 2012, European Telecommunications Standards Institute, Sophia Antipolis, France, pp. 1-26.

"ETSI TS 126 969 V12.0.0 Technical Specification," Global System for Mobile Communications, Sep. 2014, European Telecommunications Standards Institute, Sophia Antipolis, France, pp. 1-66.

3GPP TS 26.267: "3rd Generation Partnership Project; Technical Specification Group Services and System Aspects; eCall Data Transfer; In-band modem solution; General description", Version 12.0.0, Release 12, Dec. 2012, pp. 1-36.

3GPP TS-SA4#80: "3rd Generation Partnership Project; Technical Specification Group Services and System Aspects; Update to Codec Inversion Detection Algorithm", S4-140994, Version 11.0.0, Release 4-8, Aug. 2014, pp. 1-4.

International Search Report and Written Opinion for International Application No. PCT/US2015/030819, ISA/EPO, Date of Mailing Aug. 6, 2015, 12 pages.

3GPP TS 26.267: "3rd Generation Partnership Project; Technical Specification Group Services and System Aspects; eCall Data Transfer; In-band modem solution; General description", Version 13.0.0, Release 13, Dec. 2015, pp. 1-36.

3GPP TS 26.268: "3rd Generation Partnership Project; Technical Specification Group Services and System Aspects; eCall Data Transfer; In-band modem solution; ANSI-C reference code", Version 13.0.0, Release 13, Dec. 2015, pp. 1-27.

* cited by examiner

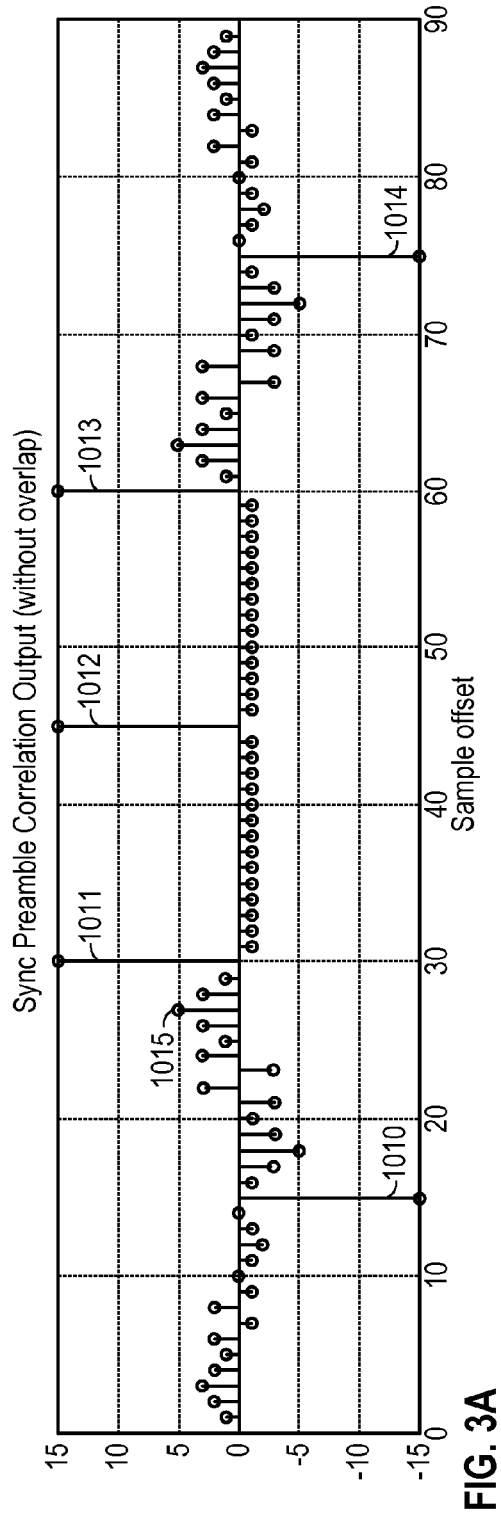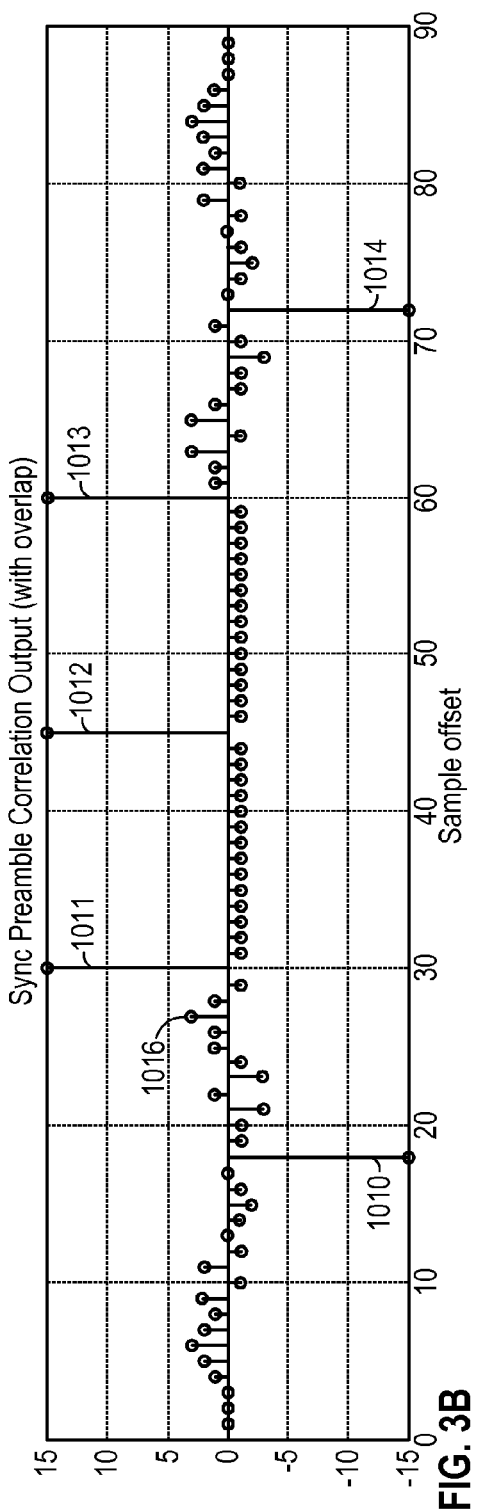
FIG. 3A
FIG. 3B

CODEC INVERSION DETECTION

I. CROSS-REFERENCE TO RELATED APPLICATIONS

The present application claims priority from U.S. Provisional Patent Application No. 61/993,000, filed May 14, 2014, which is entitled "CODEC INVERSION DETECTION," the content of which is incorporated by reference in its entirety.

II. FIELD

The present disclosure is generally related to codec inversion detection.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player.

Transmission of voice by digital techniques is widespread, particularly in long distance and digital radio telephone applications. If speech is transmitted by sampling and digitizing, a data rate on the order of sixty-four kilobits per second (kbps) may be used to achieve a speech quality of an analog telephone. Compression techniques may be used to reduce the amount of information that is sent over a channel while maintaining a perceived quality of reconstructed speech. Through the use of speech analysis, followed by coding, transmission, and re-synthesis at a receiver, a significant reduction in the data rate may be achieved.

Devices for compressing speech may find use in many fields of telecommunications. An exemplary field is wireless communications. The field of wireless communications has many applications including, e.g., cordless telephones, paging, wireless local loops, wireless telephony such as cellular and personal communication service (PCS) telephone systems, mobile IP telephony, and satellite communication systems. A particular application is wireless telephony for mobile subscribers.

Various over-the-air interfaces have been developed for wireless communication systems including, e.g., frequency division multiple access (FDMA), time division multiple access (TDMA), code division multiple access (CDMA), and time division-synchronous CDMA (TD-SCDMA). In connection therewith, various domestic and international standards have been established including, e.g., Advanced Mobile Phone Service (AMPS), Global System for Mobile Communications (GSM), and Interim Standard 95 (IS-95). An exemplary wireless telephony communication system is a CDMA system. The IS-95 standard and its derivatives, IS-95A, American National Standards Institute (ANSI) J-STD-008, and IS-95B (referred to collectively herein as IS-95), are promulgated by the Telecommunication Industry Association (TIA) and other well-known standards bodies to specify the use of a CDMA over-the-air interface for cellular or PCS telephony communication systems.

The IS-95 standard subsequently evolved into "3G" systems, such as cdma2000 and wideband CDMA (WCDMA), which provide more capacity and high speed packet data services. Two variations of cdma2000 are presented by the documents IS-2000 (cdma2000 1×RTT) and IS-856 (cdma2000 1×EV-DO), which are issued by TIA. The cdma2000 1×RTT communication system offers a peak data rate of 153 kbps whereas the cdma2000 1×EV-DO communication system defines a set of data rates, ranging from 38.4 kbps to 2.4 Mbps. The WCDMA standard is embodied in 3rd Generation Partnership Project "3GPP," Document Nos. 3G TS 25.211, 3G TS 25.212, 3G TS 25.213, and 3G TS 25.214. The International Mobile Telecommunications Advanced (IMT-Advanced) specification sets out "4G" standards. The IMT-Advanced specification sets a peak data rate for 4G service at 100 megabits per second (Mbit/s) for high mobility communication (e.g., from trains and cars) and 1 gigabit per second (Gbit/s) for low mobility communication (e.g., from pedestrians and stationary users).

Devices that employ techniques to compress speech by extracting parameters that relate to a model of human speech generation are called speech coders. Speech coders may comprise an encoder and a decoder. The encoder divides the incoming speech signal into blocks of time, or analysis frames. The duration of each segment in time (or "frame") may be selected to be short enough that the spectral envelope of the signal may be expected to remain relatively stationary. For example, a frame length may be twenty milliseconds, which corresponds to 160 samples at a sampling rate of eight kilohertz (kHz), although any frame length or sampling rate deemed suitable for a particular application may be used.

The encoder analyzes the incoming speech frame to extract certain relevant parameters and then quantizes the parameters into a binary representation, e.g., to a set of bits or a binary data packet. The data packets are transmitted over a communication channel (i.e., a wired and/or wireless network connection) to a receiver and a decoder. The decoder processes the data packets, unquantizes the processed data packets to produce the parameters, and resynthesizes the speech frames using the unquantized parameters.

The function of the speech coder is to compress the digitized speech signal into a low-bit-rate signal by removing natural redundancies inherent in speech. The digital compression may be achieved by representing an input speech frame with a set of parameters and employing quantization to represent the parameters with a set of bits. If the input speech frame has a number of bits $N_i$ and a data packet produced by the speech coder has a number of bits $N_o$, the compression factor achieved by the speech coder is $C_r = N_i/N_o$. The challenge is to retain high voice quality of the decoded speech while achieving the target compression factor. The performance of a speech coder depends on (1) how well the speech model, or the combination of the analysis and synthesis process described above, performs, and (2) how well the parameter quantization process is performed at the target bit rate of $N_o$ bits per frame. The goal of the speech model is thus to capture the essence of the speech signal, or the target voice quality, with a small set of parameters for each frame.

Speech coders generally utilize a set of parameters (including vectors) to describe the speech signal. A good set of parameters ideally provides a low system bandwidth for the reconstruction of a perceptually accurate speech signal.

Pitch, signal power, spectral envelope (or formants), amplitude and phase spectra are examples of the speech coding parameters.

Speech coders may be implemented as time-domain coders, which attempt to capture the time-domain speech waveform by employing high time-resolution processing to encode small segments of speech (e.g., 5 millisecond (ms) sub-frames) at a time. For each sub-frame, a high-precision representative from a codebook space is found by means of a search algorithm. Alternatively, speech coders may be implemented as frequency-domain coders, which attempt to capture the short-term speech spectrum of the input speech frame with a set of parameters (analysis) and employ a corresponding synthesis process to recreate the speech waveform from the spectral parameters. The parameter quantizer preserves the parameters by representing them with stored representations of code vectors in accordance with known quantization techniques.

One time-domain speech coder is the Code Excited Linear Predictive (CELP) coder. In a CELP coder, the short-term correlations, or redundancies, in the speech signal are removed by a linear prediction (LP) analysis, which finds the coefficients of a short-term formant filter. Applying the short-term prediction filter to the incoming speech frame generates an LP residue signal, which is further modeled and quantized with long-term prediction filter parameters and a subsequent stochastic codebook. Thus, CELP coding divides the task of encoding the time-domain speech waveform into the separate tasks of encoding the LP short-term filter coefficients and encoding the LP residue. Time-domain coding can be performed at a fixed rate (i.e., using the same number of bits, No, for each frame) or at a variable rate (in which different bit rates are used for different types of frame contents). Variable-rate coders attempt to use an amount of bits that would encode the parameters to a level adequate to obtain a target quality.

Time-domain coders such as the CELP coder may rely upon a high number of bits, NO, per frame to preserve the accuracy of the time-domain speech waveform. Such coders may deliver excellent voice quality provided that the number of bits, No, per frame is relatively large (e.g., 8 kbps or above). At low bit rates (e.g., 4 kbps and below), time-domain coders may fail to retain high quality and robust performance due to the limited number of available bits. At low bit rates, the limited codebook space clips the waveform-matching capability of time-domain coders, which are deployed in higher-rate commercial applications. Hence, many CELP coding systems operating at low bit rates suffer from perceptually significant distortion characterized as noise.

An alternative to CELP coders at low bit rates is the "Noise Excited Linear Predictive" (NELP) coder, which operates under similar principles as a CELP coder. NELP coders use a filtered pseudo-random noise signal to model speech, rather than a codebook. Since NELP uses a simpler model for coded speech, NELP achieves a lower bit rate than CELP. NELP may be used for compressing or representing unvoiced speech or silence.

Coding systems that operate at rates on the order of 2.4 kbps are generally parametric in nature. That is, such coding systems operate by transmitting parameters describing the pitch-period and the spectral envelope (or formants) of the speech signal at regular intervals. Illustrative of such parametric coders is the LP vocoder.

LP vocoders model a voiced speech signal with a single pulse per pitch period. This basic technique may be augmented to include transmission information about the spectral envelope, among other things. Although LP vocoders provide reasonable performance generally, they may introduce perceptually significant distortion, characterized as buzz.

In recent years, coders have emerged that are hybrids of both waveform coders and parametric coders. Illustrative of these hybrid coders is the prototype-waveform interpolation (PWI) speech coding system. The PWI speech coding system may also be known as a prototype pitch period (PPP) speech coder. A PWI speech coding system provides an efficient method for coding voiced speech. The basic concept of PWI is to extract a representative pitch cycle (the prototype waveform) at fixed intervals, to transmit its description, and to reconstruct the speech signal by interpolating between the prototype waveforms. The PWI method may operate either on the LP residual signal or the speech signal.

In traditional telephone systems (e.g., public switched telephone networks (PSTNs)), signal bandwidth is limited to the frequency range of 300 Hertz (Hz) to 3.4 kHz. In wideband (WB) applications, such as cellular telephony and voice over internet protocol (VoIP), signal bandwidth may span the frequency range from 50 Hz to 7 kHz. Super wideband (SWB) coding techniques support bandwidth that extends up to around 16 kHz. Extending signal bandwidth from narrowband telephony at 3.4 kHz to SWB telephony of 16 kHz may improve the quality of signal reconstruction, intelligibility, and naturalness.

Information sharing is a goal of communication systems in support of a demand for instant and ubiquitous connectivity. Users of communication systems may transfer speech, video, text messages, and other data to stay connected. Newly developed applications tend to outpace evolution of communication networks and may require upgrades to communication system modulation schemes and protocols. In some remote geographical areas, speech services may be available but advanced data services may be unavailable due to a lack of infrastructure support. Alternatively, users may choose to enable speech services and disable data services on their communications device due to economic reasons. In some countries, public services support in the communication network may be mandated, such as Emergency 911 (E911) or in-vehicle emergency call (eCall). In emergency applications, fast data transfer is a priority but may not be realistic when advanced data services are not available at a user terminal Established techniques have provided solutions to transmit data through a speech codec, but these solutions may be able to support only low data rate transfers due to coding inefficiencies incurred when trying to encode a non-speech signal with a vocoder.

The speech compression algorithms implemented by most vocoders utilize "analysis by synthesis" techniques to model a human vocal tract with sets of parameters. The sets of parameters commonly include functions of digital filter coefficients, gains, and stored signals known as codebooks to name a few. A search for parameters which most closely match characteristics of an input speech signal may be performed at an encoder of the vocoder. The parameters may be used at a decoder of the vocoder to synthesize an estimate of the input speech signal. The parameter sets available to the vocoder to encode signals may be tuned to model speech characterized by voiced periodic segments as well as unvoiced segments which have noise-like characteristics. Signals which do not contain periodic or noise-like characteristics may not be effectively encoded by the vocoder and may result in severe distortion in a decoded output in some cases. Examples of signals which do not exhibit speech characteristics include rapidly changing single frequency (tone) signals or dual tone multiple frequency (DTMF) signals. Most vocoders may be unable to efficiently and effectively encode such signals.

Transmitting data through a speech codec is commonly referred to as transmitting data "in-band," where the data is incorporated into one or more speech packets output from a speech codec. Several techniques use audio tones at predetermined frequencies within a speech frequency band to represent the data. Using predetermined frequency tones to transfer data through speech codecs, especially at higher data rates, may be unreliable due to the vocoders employed in the systems. The vocoders may be designed to model speech signals using a limited number of parameters. The limited parameters may be insufficient to effectively model the tone signals. The ability of the vocoders to model the tones may be further degraded when attempting to increase a transmission data rate by changing the tones quickly. The degradation in the ability to model the tones may affect detection accuracy and may result in addition of complex schemes to minimize data errors which in turn may further reduce an overall data rate of the communication system. For example, the detection accuracy may be reduced due to codec inversion. Codec inversion may refer to an inverted signal being received by the decoder of the vocoder. Failure to detect the codec inversion at the decoder of the vocoder may decrease the detection accuracy.

IV. SUMMARY

Systems and methods of detecting codec inversion are disclosed. For example, a public safety answering point (PSAP) may receive a signal. In a particular example, the PSAP may receive the signal from an in-vehicle eCall system. The PSAP may determine whether a synchronization (sync) preamble is detected in the signal. The sync preamble may indicate that the signal corresponds to a data signal, such as from the in-vehicle eCall system. If a sync preamble is detected in the signal, the PSAP may determine whether codec inversion is detected in the signal. For example, the PSAP may generate an inverted signal by inverting the signal.

The PSAP may determine whether codec inversion is detected in the signal based on the signal and the inverted signal. For example, the PSAP may determine whether codec inversion is detected based at least partially on determining whether a sync preamble is detected in the signal, whether the sync preamble is detected in the inverted signal, a first aggregation of correlation peaks of the signal, and a second aggregation of correlation peaks of the inverted signal, as described herein. Codec inversion may indicate that a sign of the signal is flipped (or inverted). An inverted signal may refer to the signal having a reversed sign or to a negated signal. If codec inversion is detected, the PSAP may invert the signal prior to further processing, e.g., by a modem.

As another example, the in-vehicle eCall system may receive a signal, e.g., from the PSAP, and the in-vehicle eCall system may determine whether codec inversion is detected. If codec inversion is detected, the in-vehicle eCall system may invert the received signal prior to further processing.

In a particular aspect, a device includes a receiver and a processor. The receiver is configured to receive a signal. The processor is configured to generate a first flag indicating whether the signal satisfies one or more first conditions. The one or more first conditions are based on a first number of detected correlation peaks associated with the signal, a first correlation peak amplitude, or both. The processor is also configured to generate a first value of a first synchronization sign indicator associated with the signal. The processor is further configured to generate a second flag indicating whether an inverted signal satisfies one or more second conditions. The one or more second conditions are based on a second number of detected correlation peaks associated with the inverted signal, a second correlation peak amplitude, or both. The processor is also configured to generate a second value of a second synchronization sign indicator associated with the inverted signal. The processor is further configured to generate an invert flag that indicates whether synchronization inversion is detected in the signal based at least in part on the first flag, the second flag, the first value, and the second value.

In another particular aspect, a method includes receiving a signal at a device. The method also includes generating, at the device, an invert flag indicating whether synchronization inversion is detected in the signal based at least in part on a first flag, a second flag, a first value of a first synchronization sign indicator associated with the signal, and a second value of a second synchronization sign indicator associated with an inverted signal. The first flag indicates whether the signal satisfies one or more first conditions. The one or more first conditions are based on a first number of detected correlation peaks associated with the signal, a first correlation peak amplitude, or both. The second flag indicates whether the inverted signal satisfies one or more second conditions. The one or more second conditions are based on a second number of detected correlation peaks associated with the inverted signal, a second correlation peak amplitude, or both.

A computer-readable storage device stores instructions that, when executed by a processor, cause the processor to perform operations including receiving a signal at a device. The operations also include generating, at the device, an invert flag indicating whether synchronization inversion is detected in the signal based at least in part on a first flag, a second flag, a first value of a first synchronization sign indicator associated with the signal, and a second value of a second synchronization sign indicator associated with an inverted signal. The first flag indicates whether the signal satisfies one or more first conditions. The one or more first conditions are based on a first number of detected correlation peaks associated with the signal, a first correlation peak amplitude, or both. The second flag indicates whether the inverted signal satisfies one or more second conditions. The one or more second conditions are based on a second number of detected correlation peaks associated with the inverted signal, a second correlation peak amplitude, or both.

In another particular aspect, a device includes a receiver, a first synchronization preamble detector, a second synchronization preamble detector, and a codec inversion detector. The receiver is configured to receive a signal. The first synchronization preamble detector is configured to generate a first flag indicating whether a synchronization preamble is detected in the signal and to generate a first measure by aggregating correlation peaks that correspond to the signal. The second synchronization preamble detector is configured to generate an inverted signal based on the signal, to generate a second flag indicating whether the synchronization preamble is detected in the inverted signal, and to generate a second measure by aggregating correlation peaks that correspond to the inverted signal. The codec inversion detector is configured to generate an invert flag that indicates whether codec inversion is detected in the signal based at least partially on the first flag, the second flag, the first measure, and the second measure.

In another particular aspect, a method includes receiving, at a device, a signal. The method also include generating, at the device, an invert flag indicating whether codec inversion is detected in the signal based at least in part on a first flag, a second flag, a first measure, and a second measure. The first flag indicates whether a synchronization preamble is detected in the signal. The first measure is based on a first aggregate of correlation peaks corresponding to the signal. The second flag indicates whether the synchronization preamble is detected in an inverted signal. The inverted signal is based on the signal. The second measure is based on a second aggregate of correlation peaks corresponding to the inverted signal.

In another particular aspect, a computer-readable storage device stores instructions that, when executed by a processor, cause the processor to perform operations including receiving a signal and generating an invert flag indicating whether codec inversion is detected in the signal based at least in part on a first flag, a second flag, a first measure, and a second measure. The first flag indicates whether a synchronization preamble is detected in the signal. The first measure is based on a first aggregate of correlation peaks corresponding to the signal. The second flag indicates whether the synchronization preamble is detected in an inverted signal. The inverted signal is based on the signal. The second measure is based on a second aggregate of correlation peaks corresponding to the inverted signal.

Particular advantages provided by at least one of the disclosed examples include detecting codec inversion. For example, the PSAP may detect codec inversion in a signal received from an in-vehicle eCall system. The PSAP may address the codec inversion by inverting the signal prior to further processing. Thus, the PSAP may be able to correct the error instead of having to discard the signal. In the other direction, the in-vehicle eCall system may detect codec inversion in a second signal received from the PSAP. The in-vehicle eCall system may address the codec inversion by inverting the second signal prior to further processing. Thus, the in-vehicle eCall system may be able to correct the error instead of having to discard the second signal. In an emergency application, a quick response time may be advantageous. For example, the PSAP may be able to respond faster by correcting the error in the signal instead of waiting to receive an additional signal from the in-vehicle eCall system that is not inverted and the in-vehicle eCall system may be able to process data sent from the PSAP faster by correcting the error in the second signal instead of waiting to receive an additional signal from the PSAP that is not inverted. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIG. 3A is a graph of a particular example of a synchronization preamble correlation output where the preamble is comprised of non-overlapped reference sequences;

FIG. 3B is a graph of a particular example of a synchronization preamble correlation output where the preamble is comprised of overlapped reference sequences;

VI. DETAILED DESCRIPTION

Figure 1:
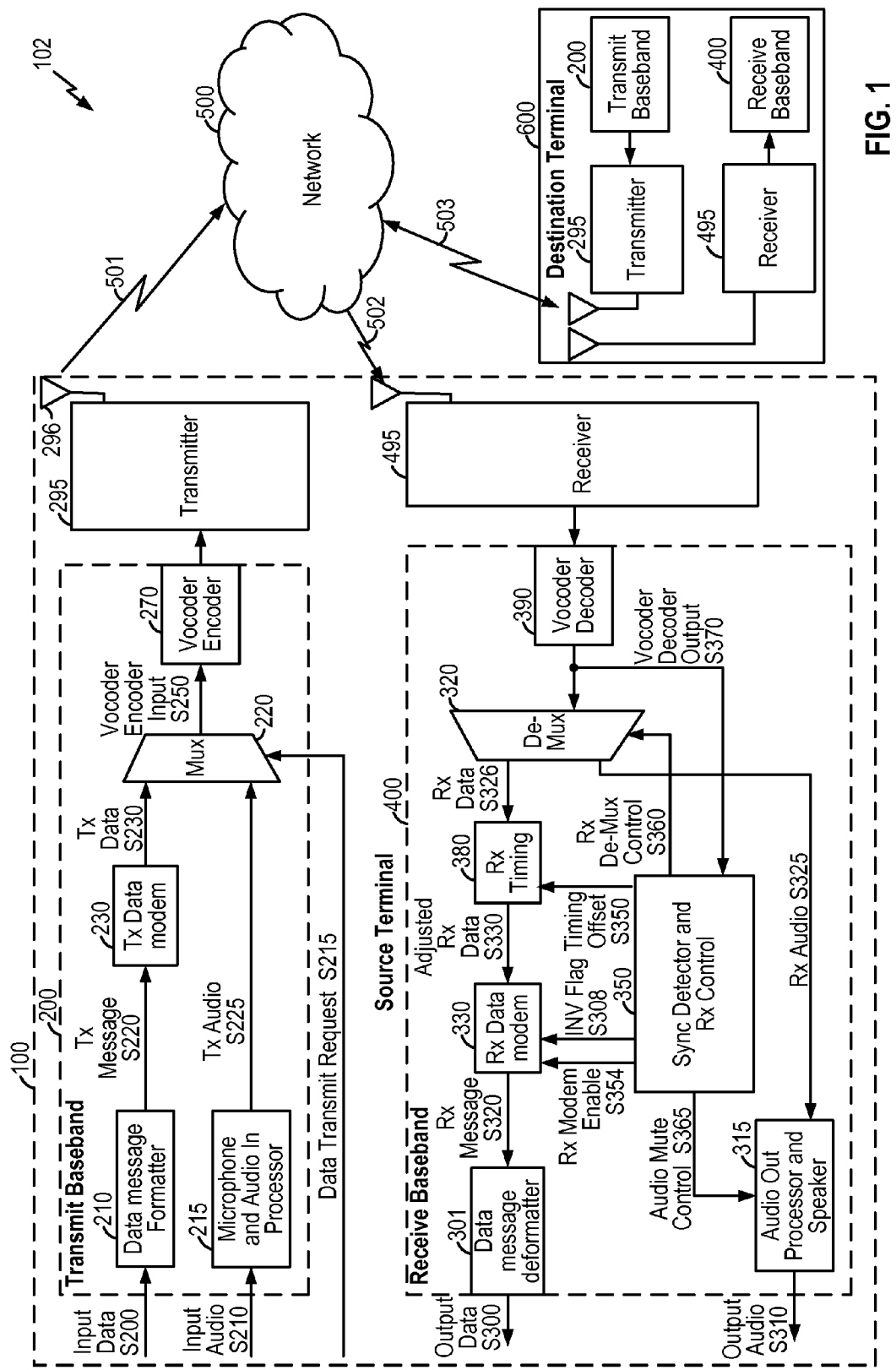
FIG. 1 is a diagram to illustrate a particular example of a system that is operable to detect codec inversion.

Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from another component, block or device), and/or retrieving (e.g., from a memory register or an array of storage elements).

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, it is well understood by a person having ordinary skill in the art, that there may be other blocks or components between the structures being "coupled."

The term "configuration" may be used in reference to a method, apparatus/device, and/or system as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more." The term "at least two" is used to indicate any of its ordinary meanings, including "two or more."

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include in-vehicle eCall systems, PSAPs, cellular phones, PDAs, handheld devices, headsets, wireless modems, laptop computers, personal computers, etc.

Referring to FIG. 1, a particular example of a system that is operable to detect codec inversion is shown and generally designated 102. In a particular aspect, the system 102 includes a wireless source terminal 100. The source terminal 100 may communicate with a destination terminal 600 through communication channels 501 and 502, network 500, and a communication channel 503. Examples of suitable wireless communication systems include cellular telephone systems operating in accordance with GSM, Third Generation Partnership Project Universal Mobile Telecommunication System (3GPP UMTS), Third Generation Partnership Project 2 Code Division Multiple Access (3GPP2 CDMA), TD-SCDMA, and Worldwide Interoperability for Microwave Access (WiMAX) standards. One skilled in the art will recognize that the techniques described herein may be equally applied to an in-band data communication system that does not involve a wireless channel. The communication network 500 may include any combination of routing and/or switching equipment, communications links and other infrastructure suitable for establishing a communication link between the source terminal 100 and the destination terminal 600. For example, the communication channel 503 may not be a wireless link. The source terminal 100 may function as a voice communication device.

Transmitter

The source terminal 100, the destination terminal 600, or both, may include a transmit baseband 200 coupled to, or in communication with, a transmitter 295. The transmit baseband 200 may route user speech through a vocoder. The transmit baseband 200 may also be capable of routing non-speech data through the vocoder in response to a request originating from the source terminal 100, the communication network 500, or the destination terminal 600. Routing non-speech data through the vocoder may be advantageous because the source terminal 100 (or the destination terminal 600) may not have to request and transmit the data over a separate communications channel. The non-speech data may be formatted into messages. The message data, in digital form, may be converted into a noise-like signal comprised of shaped pulses. The message data information may be built into pulse positions of the noise-like signal. The noise-like signal may be encoded by the vocoder. The vocoder may be configured the same whether an input to the vocoder is user speech or non-speech data. It may be advantageous to convert the message data into a signal which may be effectively encoded by a transmission parameter set allocated to the vocoder.

The encoded noise-like signal may be transmitted in-band over a communication link. For example, the communication link may include the communication channel 501, the communication network 500, and the communication channel 503. As another example, the communication link may include the communication channel 503, the communication network 500, and the communication channel 502. Because the transmitted information is built in the pulse positions of the noise-like signal, reliable detection may depend on recovery of timing of the pulses relative to a speech codec frame boundaries. To aid a receiver (e.g., a receive baseband 400) in detecting the in-band transmission, a predetermined synchronization signal may be generated and encoded by the vocoder prior to transmission of the message data. A protocol sequence of synchronization, control, and messages may be transmitted to ensure reliable detection and demodulation of the non-speech data at the receiver.

The transmit baseband 200 may include a data message formatter 210 coupled to a multiplexer (MUX) 220 via a transmit (Tx) data modem 230. The transmit baseband 200 may include a microphone and audio input processor 215 coupled to the MUX 220. The MUX 220 may be coupled to the transmitter 295 via a vocoder encoder 270. During operation, a signal input audio S210 may be provided to the microphone and audio input processor 215 and transferred through the MUX 220 to the vocoder encoder 270 where compressed voiced packets may be generated. An audio input processor typically includes circuitry to convert an input signal into a digital signal and a signal conditioner (e.g., a low-pass filter) to shape the digital signal. For example, the microphone and audio input processor 215 may receive the signal input audio S210. The microphone and audio input processor 215 may convert the signal input audio S210 into a digital signal and may generate the Tx audio S225 by applying a signal conditioner (e.g., the low-pass filter) to the digital signal. The microphone and audio input processor 215 may provide the Tx audio S225 to the MUX 220. The MUX 220 may generate vocoder encoder input S250 based on the Tx audio S225. The MUX 220 may provide the vocoder encoder input S250 to the vocoder encoder 270.

The vocoder encoder 270 may generate compressed voiced packets based on the vocoder encoder input S250. Examples of vocoders include those described by the following reference standards: GSM-FR, GSM-HR, GSM-EFR, EVRC, EVRC-B, SMV, QCELP13K, IS-54, AMR, G.723.1, G.728, G.729, G.729.1, G.729a, G.718, G.722.1, AMR-WB, EVRC-WB, VMR-WB. The vocoder encoder 270 may supply the voiced packets to the transmitter 295 and the transmitter 295 may transmit the voiced packets via an antenna 296 over a communication channel (e.g., the communication channel 501 or the communication channel 503).

A request for data transmission (e.g., a data transmit request S215) may be initiated by the source terminal 100

(or the destination terminal 600) or through the communication network 500. The data transmit request S215 may disable a voice path through the MUX 220 and may enable a transmit data path. For example, the data message formatter 210 may receive an input data S200. The data message formatter 210 may pre-process the input data S200 and may output a Tx Message S220 to the Tx data modem 230. The input data S200 may include user interface (UI) information, user position/location information, time stamps, equipment sensor information, or other suitable data. The data message formatter 210 may include circuitry to calculate and append cyclic redundancy check (CRC) bits to the input data S200, may provide retransmission buffer memory, may implement error control coding (e.g., hybrid automatic repeat-request (HARQ)), and may interleave the input data S200. The Tx data modem 230 may convert the Tx message S220 to data signal Tx data S230. The Tx data modem 230 may provide the Tx data S230, via the MUX 220, to the vocoder encoder 270. The vocoder encoder 270 may encode the Tx data S230 and may provide the encoded Tx data S230 to the transmitter 295. The transmitter 295 may transmit the encoded Tx data S230 via the antenna 296. Once data transmission is complete the voice path may be re-enabled through the MUX 220.

In a particular aspect, the Tx data modem 230 may multiplex three signals (e.g., Sync Out, Mute Out, and Tx Mod Out) in time through a mux onto the Tx data S230. It should be recognized that different orders and combinations of signals Sync Out, Mute Out, and Tx Mod Out may be output onto Tx data S230. For example, Sync Out may be sent prior to each Tx Mod Out data segment. As another example, Sync Out may be sent once prior to a complete Tx Mod Out with Mute Out sent between each Tx Mod Out data segment.

Sync Out may be a synchronization signal used to establish timing at a receiving terminal (e.g., the receive baseband 400). Synchronization signals may be used to establish timing for transmitted in-band data since the data information is built in the pulse positions of the noise-like signal. A Sync Generator may multiplex three signals (Sync Burst, Wakeup Out, and Sync Preamble Out) in time through a mux onto the Sync Out signal. It should be recognized that different orders and combinations of Sync Burst, Wakeup Out, and Sync Preamble Out may be output onto Sync Out. For example, Wakeup Out may be sent prior to each Sync Preamble Out. As another example, Sync Burst may be sent prior to each Sync Preamble Out.

Sync Burst may be used to establish coarse timing at the receive baseband 400 and may be comprised of at least one sinusoidal frequency signal having a predetermined sampling rate, sequence, and duration. Examples of frequency signals include constant frequency sinusoids in a voice band, such as 395 Hz, 540 Hz, and 512 Hz for one sinusoidal signal and 558 Hz, 1035 Hz, and 724 Hz for another sinusoidal signal. A Sync Burst Sequence may determine which frequency signal is multiplexed by the Sync Generator. An information sequence modulated onto the synchronization burst should be one with good autocorrelation properties. An example of a Sync Burst Sequence is a Barker code (e.g., "+ + + − − + −") of length 7. In a particular example, the Sync Generator may output a frequency sinusoid representing binary data +1 for each '+' symbol and may output a frequency sinusoid representing binary data −1 for each '−' symbol of the Sync Burst Sequence.

Sync Preamble Out may be used to establish fine (sample based) timing at the receive baseband 400 and may be comprised of a predetermined data pattern known at the receive baseband 400. An example of a Sync Preamble Out predetermined data pattern is a synchronization (Sync) Preamble Sequence 241, described with reference to FIG. 2A.

Wakeup Out may be used to trigger the vocoder encoder 270 to wake up from a sleep state, low transmission rate state, or discontinuous transmission state. Wakeup Out may also be used to prohibit the vocoder encoder 270 from entering the sleep, low transmission, or discontinuous transmission state. Wakeup Out may be generated by a Wakeup Generator. Wakeup signals may be advantageous when transmitting in-band data through vocoders which implement sleep, discontinuous transmit functions (DTX), or operate at a lower transmission rate during inactive voice segments to reduce a startup delay which may occur in transitioning from a voice inactive state to a voice active state. Wakeup signals may also be used to identify a characteristic of a transmission mode (e.g., a type of modulation scheme employed).

An example of the Wakeup Out is a single sinusoidal signal of constant frequency in a voice band, such as 395 Hz. The Wakeup signal may prohibit the vocoder encoder 270 from entering the sleep, DTX, or low rate state. The receive baseband 400 may ignore the transmitted Wakeup Out.

Another example of the Wakeup Out is a signal comprised of multiple sinusoidal signals with each signal identifying a specific data modulation scheme (e.g., 500 Hz for modulation scheme 1, 800 Hz for modulation scheme 2, etc.). The Wakeup signal may prohibit the vocoder encoder 270 from entering the sleep, DTX, or low rate state. The receive baseband 400 may use the transmitted Wakeup Out to identify the data modulation scheme.

An example of Tx Mod Out is a signal generated by a modulator using pulse-position modulation (PPM) with special modulation pulse shapes. This modulation technique may result in low distortion when encoded and decoded by different types of vocoders. Additionally, this technique may result in good autocorrelation properties and may be easily detected by a receiver matched to the waveform. Further, the shaped pulses may not have a tonal structure; instead the signals may appear noise-like in the frequency spectrum domain as well as retain a noise-like audible characteristic. A power spectral density of a signal based on shaped pulses may display a noise-like characteristic over an in-band frequency range (e.g., constant energy over the frequency range). Conversely, a power spectral density of a signal with a tonal structure, where the data is represented by tones at particular frequencies (e.g., approximately 400 Hz, 600 Hz, and 1000 Hz), may displays "spikes" of significant energy over the in-band frequency range at the tone frequencies and its harmonics.

The modulator may include a sparse pulse generator. The sparse pulse generator may produce pulses corresponding to input Tx message S220 using pulse position modulation. A pulse shaper may shape the pulses to create a signal (e.g., Tx data S230) for better coding quality in the vocoder encoder 270.

A time axis may be divided into modulation frames of duration TMF. Within each such modulation frame, a number of time instances t0, t1, . . . , tm−1 may be defined relative to a modulation frame boundary, which identify potential positions of a basic pulse p(t). For example, a pulse at position t3 may be denoted as p(t-t3). The Tx Message S220 information bits input to the modulator may be mapped to symbols with corresponding translation to pulse positions according to a mapping table. The pulse may also be shaped with a polarity transform, +p(t). The symbols may therefore be represented by one of 2m distinct signals within a modulation frame where m represents a number of time instances defined for the modulation frame and a multiplication factor (e.g., 2) represents a positive and negative polarity.

An example of a pulse position mapping is shown in Table 1. In this example, the modulator may map a 4-bit symbol for each modulation frame. Each symbol is represented in terms of a position k of a pulse shape p(n-k) and a sign of the pulse. In this example, TMF is 4 milliseconds resulting in 32 possible positions for an 8 KHz sample rate. The pulses are separated by 4 time instances resulting in an assignment of 16 different pulse position and polarity combinations. In this example, an effective data rate is 4 bits per symbol in a 4 millisecond period or 1000 bits/second.

TABLE 1

| Symbol | | Pulse |
|---|---|---|
| decimal | binary | |
| 0 | 0000 | p(n − 0) |
| 1 | 0001 | p(n − 4) |
| 2 | 0010 | p(n − 8) |
| 3 | 0011 | p(n − 12) |
| 4 | 0100 | p(n − 16) |
| 5 | 0101 | p(n − 20) |
| 6 | 0110 | p(n − 24) |
| 7 | 0111 | p(n − 28) |
| 8 | 1000 | −p(n − 28) |
| 9 | 1001 | −p(n − 24) |
| 10 | 1010 | −p(n − 20) |
| 11 | 1011 | −p(n − 16) |
| 12 | 1100 | −p(n − 12) |
| 13 | 1101 | −p(n − 8) |
| 14 | 1110 | −p(n − 4) |
| 15 | 1111 | −p(n − 0) |

An example of a pulse shaper is a root-raised cosine transform of the form:

$$r(t) = \begin{cases} 1 - \beta + \frac{4\beta}{\pi}, & t = 0 \\ \frac{\beta}{\sqrt{2}}\left[\left(1 + \frac{2}{\pi}\right)\sin\left(\frac{\pi}{4\beta}\right) + \left(1 - \frac{2}{\pi}\right)\cos\left(\frac{\pi}{4\beta}\right)\right], & t = \pm\frac{T_s}{4\beta} \\ \frac{\sin\left[\pi\frac{t}{T_s}(1-\beta)\right] + 4\beta\frac{t}{T_s}\cos\left[\pi\frac{t}{T_s}(1+\beta)\right]}{\pi\frac{t}{T_s}\left[1 - \left(4\beta\frac{t}{T_s}\right)^2\right]}, & \text{otherwise} \end{cases}$$

where $\beta$ is the roll-off factor, $1/T_s$ is the maximum symbol rate, and t is the sampling time instance.

For the previous example with 32 possible pulse positions (time instances), the following transform may generate a root raised cosine pulse shape where a number of zeroes prior to a first nonzero element of a pulse determines an exact position of the pulse within a frame.

$$r(n) = \begin{bmatrix} 0 & 0 & 0 & 40 \\ -200 & 560 & -991 & -1400 \\ 7636 & 15000 & 7636 & -1400 \\ -991 & 560 & -200 & 40 \\ 0 & 0 & 0 & 0 \\ 0 & 0 & 0 & 0 \\ 0 & 0 & 0 & 0 \\ 0 & 0 & 0 & 0 \end{bmatrix}$$

It should be recognized that the transform may be shortened or lengthened for different variants of modulation frame sizes.

Receiver

The source terminal 100, the destination terminal 600, or both, may include the receive baseband 400 coupled to, or in communication with, a receiver 495. The receive baseband 400 may route decoded voice packets from a vocoder to an audio processor. The receive baseband 400 may also be capable of routing decoded packets through a data demodulator. Because non-speech data may be converted to a noise-like signal and encoded by a vocoder at the transmit baseband 200, a vocoder at the receive baseband 400 may be able to effectively decode the data with minimal distortion. The receive baseband 400 may monitor the decoded packets for an in-band synchronization signal. If a synchronization signal is found, the receive baseband 400 may recover a frame timing and may route the decoded packets to a data demodulator. The data demodulator may demodulate the decoded packets into messages. The receive baseband 400 may de-format and output the messages. A protocol sequence comprising synchronization, control, and messages may ensure reliable detection and demodulation of the non-speech data.

The receive baseband 400 may include a vocoder decoder 390 coupled to a de-multiplexer (de-mux) 320 and to a sync detector and receive (Rx) control 350. The de-mux 320 may be coupled to a data message deformatter 301 via Rx Timing 380 and Rx data modem 330. The de-mux 320 may be coupled to an audio out processor and speaker 315. The sync detector and Rx control 350 may be coupled to the de-mux 320, the Rx Timing 380, the Rx data modem 330, the audio out processor and speaker 315, or a combination thereof.

During operation, the receiver 495 may receive packets over a communication channel (e.g., the communication channel 502 or the communication channel 503). The receiver 495 may provide the packets to the vocoder decoder 390. The vocoder decoder 390 may generate vocoder decoder output S370 by decoding the packets. The vocoder decoder 390 may provide the vocoder decoder output S370 to the de-mux 320. The de-mux 320 may generate Rx audio S325 based on the vocoder decoder output S370. The de-mux 320 may provide the Rx audio S325 to the audio out processor and speaker 315. The audio out processor and speaker 315 may process the Rx audio S325 to generate and output the output audio S310.

In a particular example, the vocoder decoder 390 may provide the vocoder decoder output S370 to the sync detector and Rx control 350. The sync detector and Rx control 350 may determine whether a synchronization signal is detected in the vocoder decoder output S370, as further described with reference to FIG. 7. For example, the sync detector and Rx control 350 may detect the synchronization signal based at least in part on determining that a synchronization preamble is included in the vocoder decoder output S370. The sync detector and Rx control 350 may also determine whether codec inversion is detected in the vocoder decoder output S370. For example, the receiver 495 may receive a signal corresponding to the packets and a sign of the signal may be inverted. The sync detector and Rx control 350 may detect the codec inversion (i.e., the inverted sign of the signal).

In response to determining whether the synchronization signal is detected in the vocoder decoder output S370, the sync detector and Rx control 350 may provide Rx de-mux control S360 to the de-mux 320, a timing offset S350 to the Rx Timing 380, an audio mute control S365 to the audio out processor and speaker 315, and an invert (INV) flag S308 to the Rx data modem 330. The INV flag S308 may indicate whether the codec inversion is detected. The audio out processor and speaker 315 may enable or disable the output audio signal S310 based on the audio mute control S365. The de-mux 320 may switch from a receive voice path to a receive data path based on the Rx de-mux control S360. The timing offset S350 may include timing information.

For example, in response to determining that the synchronization signal is detected in the vocoder decoder output S370, the sync detector and Rx control 350 may provide the Rx de-mux control S360 to the de-mux 320 to switch from the receive voice path to the receive data path, may provide the audio mute control S365 to the audio out processor and speaker 315 to disable the output audio signal S310, may provide the INV flag S308 to the Rx data modem 330 to indicate whether the codec inversion is detected, and may provide the timing offset S350 to the Rx Timing 380.

In response to receiving the audio mute control S365, the audio out processor and speaker 315 may disable the output audio signal S310. In response to receiving the Rx de-mux control S360, the de-mux 320 may generate Rx data S326 based on the vocoder decoder output S370. The de-mux 320 may route the Rx data S326 to the Rx Timing 380. The Rx Timing 380 may generate adjusted Rx data S330 by aligning the Rx data S326 for demodulation based on the timing offset S350. The Rx Timing 380 may provide the adjusted Rx data S330 to the Rx data modem 330. The Rx data modem 330 may receive the INV flag S308 from the sync detector and Rx control 350. In response to determining that the INV flag S308 indicates that codec inversion is detected, the Rx data modem 330 may invert the adjusted Rx data S330.

The Rx data modem 330 may generate Rx message S320 by demodulating the Rx data S330. In a particular example, the Rx data modem 330 may generate the Rx message S320 by demodulating the inverted Rx data S330 when the INV flag S308 indicates that codec inversion is detected. The Rx data modem 330 may forward the Rx message S320 to the data message deformatter 301. The data message deformatter 301 may generate the output data S300 by de-formatting the Rx message S320. The output data S300 may be made available to a user or interfaced equipment (e.g., a display).

The data message deformatter 301 may include circuitry to de-interleave the Rx message S320, to implement error control decoding (e.g., HARQ), to calculate and check CRC bits, or a combination thereof. The output data S300 may include UI information, user position/location information, time stamps, equipment sensor information, or other suitable data.

The system 102 may thus enable codec inversion detection. For example, the sync detector and Rx control 350 may detect codec inversion in the vocoder decoder output S370. The sync detector and Rx control 350 may provide the INV flag S308 to the Rx data modem 330 indicating that the codec inversion is detected. The Rx data modem 330 may address the codec inversion by inverting the adjusted Rx data S330 prior to generating the Rx message S320. Thus, the Rx data modem 330 may be able to correct the error instead of generating an erroneous Rx message S320. In an emergency application, a quick response time may be advantageous. The system 102 may be able to respond faster by correcting the error in the vocoder decoder output S370 instead of waiting to receive an additional signal that is not inverted.

Figure 2A:
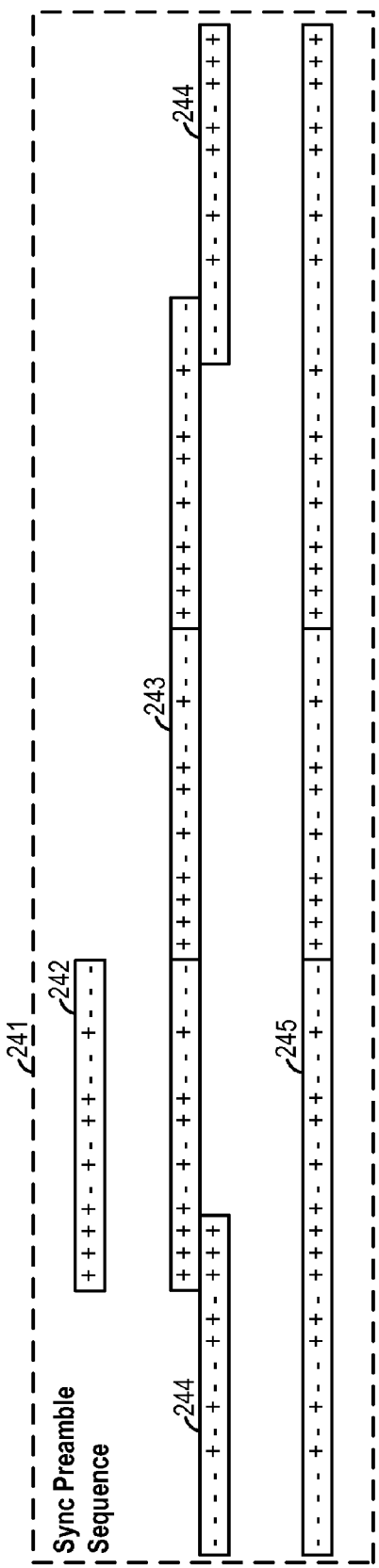
FIG. 2A is a diagram of a particular example of a synchronization preamble sequence.
Figure 2B:
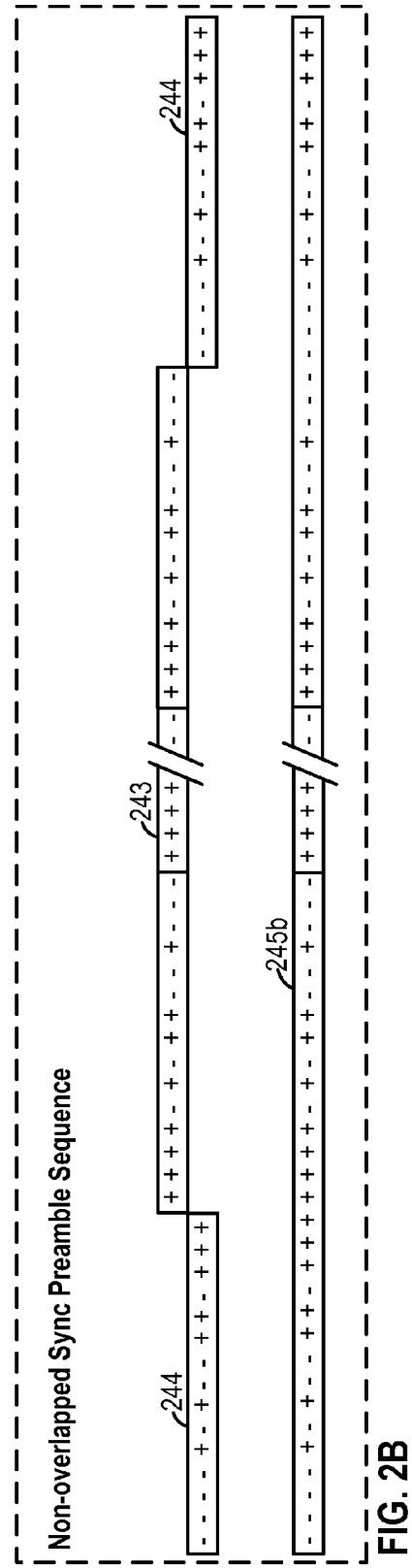
FIG. 2B is a diagram of a particular example of a synchronization preamble sequence with non-overlapping reference sequences.

FIGS. 2A and 2B illustrate particular examples of synchronization preamble sequences. FIG. 2A illustrates a preamble sequence generated by concatenating overlapped pseudorandom noise (PN) sequences. FIG. 2B illustrates a preamble sequence generated by concatenating non-overlapped PN sequences.

In a particular aspect, the Tx data modem 230 of FIG. 1 may generate a Sync Preamble Out based on the Sync Preamble Sequence 241, as described with reference to FIG. 1. For example, the Tx data modem 230 may generate the Sync Preamble Out based on an overlapped composite preamble sequence 245 or a non-overlapped composite preamble sequence 245b.

In a particular aspect, the overlapped composite preamble sequence 245 (or the non-overlapped composite preamble sequence 245b) may be generated by one or more components (e.g., the transmit baseband 200, the receive baseband 400, or both) of the system 102 of FIG. 1.

The system 102 may generate the overlapped composite preamble sequence 245 by concatenating several periods of a PN sequence 242 with an overlapped and added result of the PN sequence 242 and an inverted version of a PN sequence 244.

Alternatively, the system 102 of FIG. 1 may generate the non-overlapped composite preamble sequence 245b by concatenating several periods of the PN sequence 242 with a non-overlapped and added result of the PN sequence 242 and an inverted version of a PN sequence 244.

The '+' symbols in the overlapped composite preamble sequence 245 (or the non-overlapped composite preamble sequence 245b) may represent binary data +1 and the '−' symbols may represent binary data −1. In a particular aspect, the system 102 may insert zero valued samples between data bits of the PN sequence to generate the overlapped composite preamble sequence 245 (or the non-overlapped composite preamble sequence 245b). Inserting zero valued samples may provide temporal distance between the data bits to account for "smearing" affects caused by bandpass filter characteristics of a channel which tends to spread energy of the data bit over several bit time intervals.

The previously described construction of a sync preamble (e.g., the overlapped composite preamble sequence 245) using concatenated periods of a PN sequence with overlapped segments of inverted versions of the PN sequence may provide advantages in reduced transmission time, improved correlation properties, and improved detection characteristics. The advantages may result in a preamble which is robust to speech frame transmission errors.

By overlapping the PN segments, the resultant composite sync preamble (e.g., the overlapped composite preamble sequence 245) may include a smaller number of bits in a sequence compared to a non-overlapped version, thereby decreasing a total time of transmitting a composite preamble sequence.

FIGS. 3A and 3B illustrate graphs of particular examples of synchronization preamble correlation outputs. To illustrate an improvement in correlation properties of an overlapped sync preamble (e.g., the overlapped composite preamble sequence 245), FIG. 3A and FIG. 3B show a comparison between a correlation of the PN sequence 242 with the non-overlapped composite preamble sequence 245b, described with reference to FIG. 2B, and a correlation of the PN sequence 242 with the overlapped composite preamble sequence 245, described with reference to FIG. 2A.

FIG. 3A shows main correlation peaks (both positive and negative) as well as minor correlation peaks located between the main peaks for the non-overlapped composite preamble sequence 245b. A negative peak 1010 may result from a correlation of the PN sequence 242 with a first inverted segment of the non-overlapped composite preamble sequence 245b. Positive correlation peaks 1011, 1012, 1013, may result from a correlation of the PN sequence 242 with three concatenated segments of the PN sequence 242 which make up a middle section of the non-overlapped composite preamble sequence 245b. A negative peak 1014 may result from a correlation of the PN sequence 242 with a second inverted segment of the non-overlapped composite preamble sequence 245b. In FIG. 3A, a minor correlation peak 1015, corresponding to an offset of 3 samples from the first positive correlation peak 1011 shows a magnitude of approximately 5 (⅓rd the magnitude of the main peaks).

FIG. 3B shows several main correlation peaks (both positive and negative) as well as minor correlation peaks between the main correlation peaks for the overlapped composite preamble sequence 245. In FIG. 3B, a minor correlation peak 1016, corresponding to an offset of 3 PN samples from the first positive correlation peak 1011 shows a magnitude of approximately 3 (⅕th the magnitude of the main peaks). The smaller magnitude of the minor correlation peak 1016 for the overlapped preamble shown in FIG. 3B may result in fewer false detections of the preamble main correlation peaks when compared to the non-overlapped minor correlation peak 1015 example shown in FIG. 3A.

As shown in FIG. 3B, five major peaks are generated when correlating PN sequence 242 with the overlapped composite preamble sequence 245. The pattern shown (1 negative peak, 3 positive peaks, and 1 negative peak) may enable determination of a frame timing based on any 3 detected peaks and corresponding temporal distances between the peaks. In a particular aspect, the combination of 3 detected peaks with the corresponding temporal distance is always unique. A similar depiction of the correlation peak pattern is shown in Table 2, where the correlation peaks are referenced by a '−' for a negative peak and a '+' for a positive peak.

TABLE 2

| | Correlation Peak Number | | | | |
|---|---|---|---|---|---|
| | 1 | 2 | 3 | 4 | 5 |
| Correlation Peak Polarity | − | + | + | + | − |

The technique of using a unique correlation peak pattern may be advantageous for in-band systems since the unique pattern may compensate for possible speech frame losses, for example, due to poor channel conditions. Losing a speech frame may result in losing a correlation peak as well. By having a unique pattern of correlation peaks separated by predetermined temporal distances, a receiver may reliably detect a sync preamble even with lost speech frames which result in lost correlation peaks.

Several examples are shown in Table 3 for combinations of 3 detected peaks in the pattern (2 peaks are lost in each example).

TABLE 3

| | | Correlation Peak Number | | | | |
|---|---|---|---|---|---|---|
| | | 1 | 2 | 3 | 4 | 5 |
| Detected Correlation Peaks | Example 1 | | | + | + | — |
| | Example 2 | + | | | + | — |
| | Example 3 | + | | + | | — |

TABLE 3-continued

| | Correlation Peak Number | | | | |
|---|---|---|---|---|---|
| | 1 | 2 | 3 | 4 | 5 |
| Example 4 | | + | + | + | |
| Example 5 | — | | | + | — |
| Example 6 | — | | + | | — |
| Example 7 | — | | | + | + |
| Example 8 | — | + | | | — |
| Example 9 | — | + | | + | |
| Example 10 | — | + | + | | |

Each entry in Table 3 represents a unique pattern of peaks and temporal distances between the peaks. Example 1 in Table 3 shows detected peaks 3, 4, and 5 (peaks 1 and 2 were lost), resulting in a pattern '+ + −' with one predetermined distance between each peak. Examples 2 and 3 in Table 3 also show the pattern '+ + −', however the distances are different. Example 2 has two predetermined distances between detected peak 2 and 4, while Example 3 has two predetermined distances between detected peak 3 and 5. So Examples 1, 2 and 3 each represent a unique pattern from which the frame timing may be derived. It should be recognized that the detected peaks may extend across frame boundaries, but that the unique patterns and predetermined distances still apply.

One skilled in the art will recognize that a different preamble sequence resulting in a different correlation peak pattern to that shown in FIG. 3B and Table 2 may be used. One skilled in the art will also recognize that multiple correlation peak patterns may be used to identify different operational modes or transmit information bits. An example of an alternate correlation peak pattern is shown in Table 4.

TABLE 4

| | Correlation Peak Number | | | | |
|---|---|---|---|---|---|
| | 1 | 2 | 3 | 4 | 5 |
| Correlation Peak Polarity | + | − | − | − | + |

The correlation peak pattern shown in Table 4 may maintain a unique pattern from which frame timing may be derived, as described previously. Having multiple correlation peak patterns may be advantageous for identifying different transmitter configurations at the receive baseband 400, such as message formats or modulation schemes.

Figure 4:
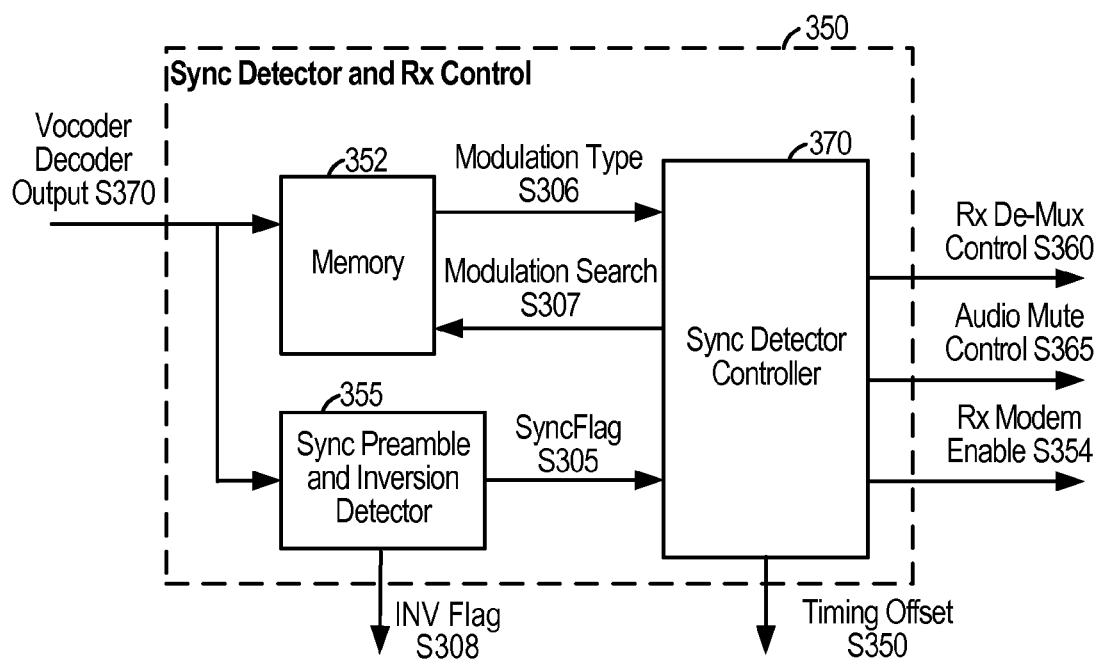
FIG. 4 is a diagram of another example of a synchronization signal detector and receiver controller that may be included in the system of FIG. 1.

Referring to FIG. 4, a particular example of the synchronization (sync) detector and Rx control 350 of FIG. 1 is shown. The sync detector and Rx control 350 includes a Memory 352 and a Sync Preamble and Inversion Detector 355 coupled to a Sync Detector Controller 370.

During operation, the Memory 352 and the Sync Preamble and Inversion Detector 355 may receive the Signal Vocoder Decoder Output S370. The Memory 352 may be used to store most recently received Vocoder Decoder Output S370 samples which may include a received Wakeup Out signal. An example of the Memory 352 is a First-In-First-Out (FIFO) or Random Access Memory (RAM).

The Sync Preamble and Inversion Detector 355 may detect a transmitted Sync Preamble Out signal in the Vocoder Decoder Output S370 and may output a sync flag (e.g., a SyncFlag S305) indicating whether the Sync Preamble Out is detected in the Vocoder Decoder Output S370, as further described with reference to FIG. 7. The Sync Detector Controller 370 may receive the SyncFlag S305 from the Sync Preamble and Inversion Detector 355. The Sync Preamble and Inversion Detector 355 may generate the INV flag S308 indicating whether codec inversion is detected in the Vocoder Decoder Output S370, as further described with reference to FIG. 7.

The Sync Detector Controller 370 may generate a Modulation Search S307 signal to access the Memory 352, may determine the Timing Offset S350 based on correlation peaks of the Vocoder Decoder Output S370, may find the received Wakeup Out signal based on the Timing Offset S350, and may evaluate the Wakeup Out signal to determine a type of modulation used in the transmission. The determined modulation type is output from the Memory 352 as Modulation Type S306. The Sync Detector Controller 370 may receive the Modulation Type S306 from the Memory 352. The Sync Detector Controller 370 may provide the Rx Modem Enable S354 to enable the Rx data modem 330. Sync Detector Controller 370 may determine the demodulation scheme used in Rx Modem Enable S354 based on the Modulation Type S306.

The Sync Detector Controller 370 may also generate output signals Rx De-Mux Control S360 which routes the Vocoder Decoder Output S370 to the data path or to the audio path, the Audio Mute Control S365 which enables or disables the output audio signal S310, and the Timing Offset S350 which provides bit timing information to Rx Timing 380 to align the Rx Data S326 for demodulation.

Figure 5:
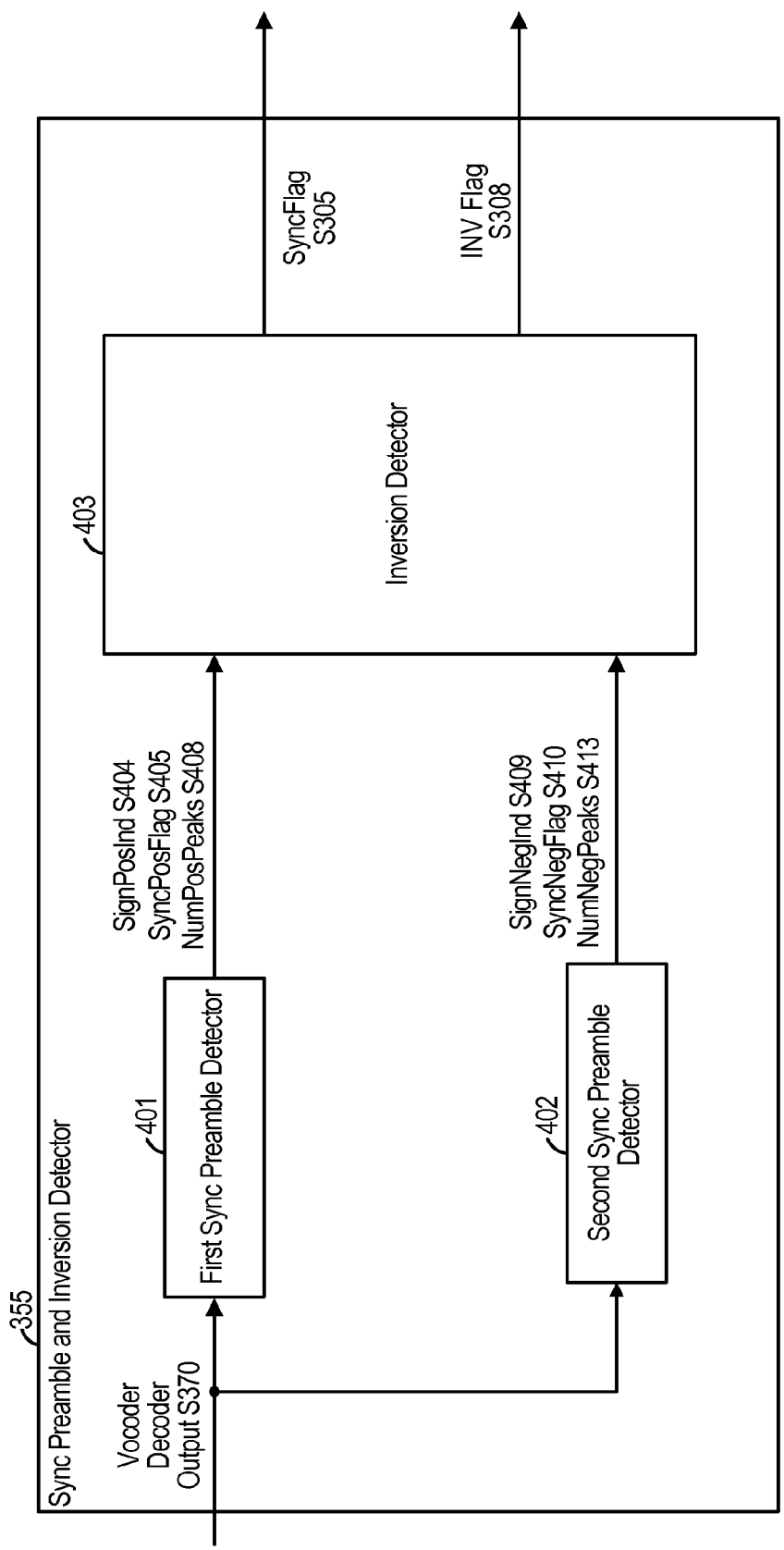
FIG. 5 is a diagram of a particular example of a synchronization preamble and inversion detector that may be included in the system of FIG. 1.

FIG. 5 illustrates a particular example of the synchronization (sync) preamble and inversion detector 355 of FIG. 4. The sync preamble and inversion detector 355 may include a first synchronization (sync) preamble detector 401 and a second sync preamble detector 402 coupled to an inversion detector 403.

During operation, the first sync preamble detector 401 and the second sync preamble detector 402 may receive the vocoder decoder output S370, e.g., from the vocoder decoder 390 of FIG. 1. The first sync preamble detector 401 may generate SignPosInd S404, SyncPosFlag S405, and NumPosPeaks S408 based on the vocoder decoder output S370, as further described with reference to FIG. 6. The second sync preamble detector 402 may generate SignNegInd S409, SyncNegFlag S410, and NumNegPeaks S413 based on an inverted version of the vocoder decoder output S370.

The inversion detector 403 may receive the SignPosInd S404, the SyncPosFlag S405, and the NumPosPeaks S408 from the first sync preamble detector 401 and may receive the SignNegInd S409, the SyncNegFlag S410, and the NumNegPeaks S413 from the second sync preamble detector 402. The inversion detector 403 may generate the SyncFlag S305, the INV Flag S308, or both, based on the SignPosInd S404, the SyncPosFlag S405, the NumPosPeaks S408, the SignNegInd S409, the SyncNegFlag S410, the NumNegPeaks S413, or a combination thereof, as described with reference to FIG. 7. For example, the SyncFlag S305 may indicate whether a preamble synchronization signal, such as corresponding to a sync preamble sequence (e.g., the Sync Preamble Sequence 241, the overlapped composite preamble sequence 245, or the non-overlapped composite preamble sequence 245*b*), is detected in the vocoder decoder output S370. The INV Flag S308 may indicate whether codec inversion is detected in the vocoder decoder output S370.

Figure 6:
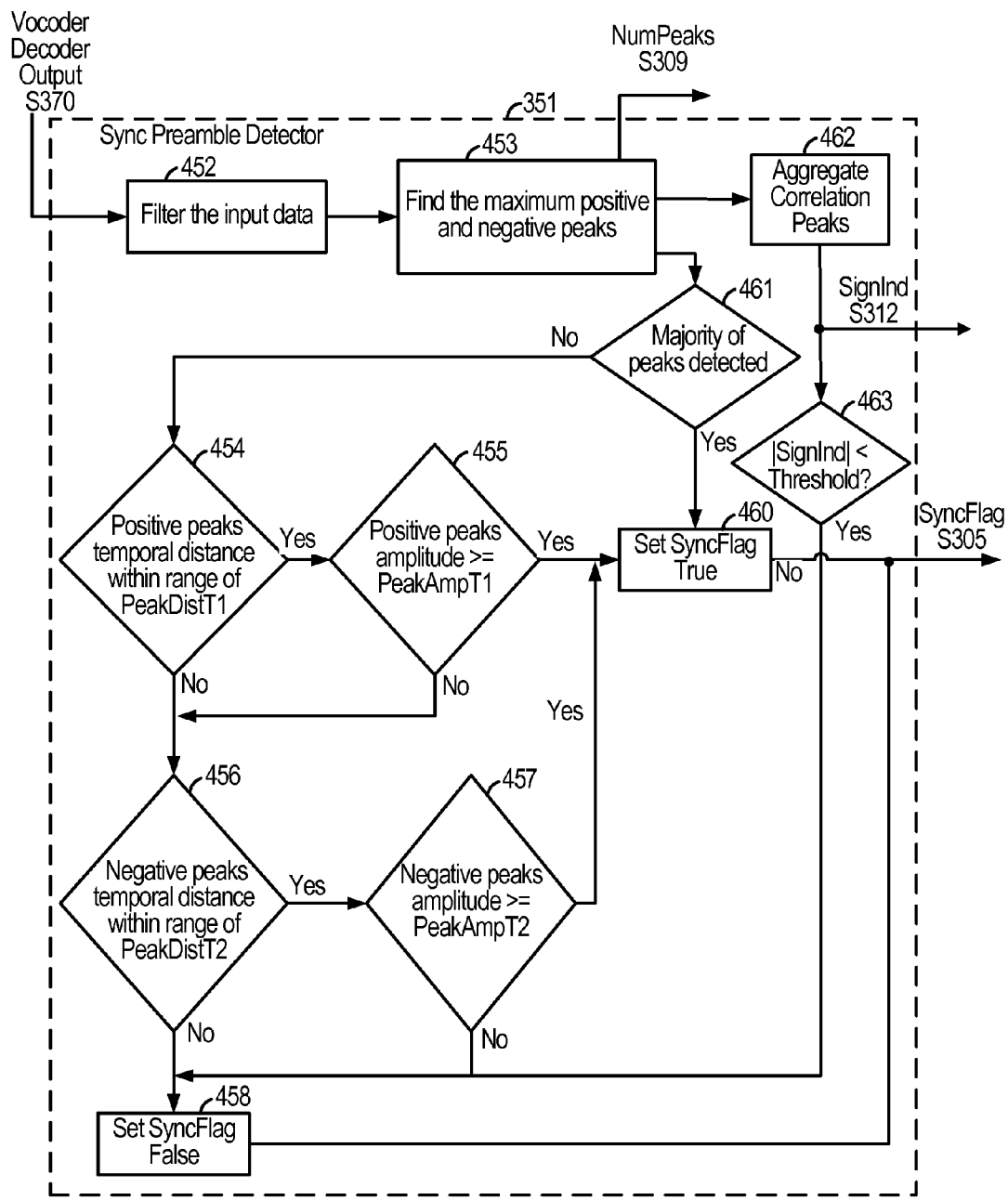
FIG. 6 is a flowchart to illustrate a particular example of a method of operation of a synchronization preamble detector. In a particular example, the synchronization preamble detector may be included in the synchronization preamble and inversion detector of FIG. 5.

Referring to FIG. 6, a flowchart of a particular example of a method of operation of a synchronization (sync) preamble detector is shown. The sync preamble detector is generally designated 351. In a particular aspect, the Sync Preamble Detector 351 may correspond to the first sync preamble detector 401, the second sync preamble detector 402 of FIG. 5, or both.

The method illustrated in FIG. 6 includes filtering input data, at 452. For example, the Sync Preamble Detector 351 may receive the Vocoder Decoder Output S370, e.g., from the vocoder decoder 390 of FIG. 1. A filter of the Sync Preamble Detector 351 may process the Vocoder Decoder Output S370 to generate a filter output.

An example of the filter is a sparse filter with coefficients based on a band-pass filtered impulse response of a Sync Preamble Sequence (e.g., the Sync Preamble Sequence 241, the overlapped composite preamble sequence 245, or the non-overlapped composite preamble sequence 245*b*). A sparse filter may have a finite-impulse-response structure with some of the coefficients set to zero and may result in a reduction in computational complexity based on fewer multipliers due to the zero coefficients. In a particular example, the sync preamble detector 351 may correspond to the second sync preamble detector 402. In this example, the Sync Preamble Detector 351 may invert the vocoder decoder output S370 and may filter the inverted version of the vocoder decoder output S370 to generate the filter output.

The method illustrated in FIG. 6 also includes finding maximum positive and negative peaks, at 453. For example, the Sync Preamble Detector 351 may search the filter output for maximum positive and negative correlation peaks which match an expected pattern based on negative and positive correlation peak distance. For example, the Sync Preamble Detector 351 may search for 5 peaks based on Sync Preamble Sequence 241. To illustrate, the Sync Preamble Detector 351 may search for 3 positive peaks corresponding to correlation with the PN sequence 243 and 2 negative peaks corresponding to correlation with the inverted version of the PN sequence 244.

The Sync Preamble Detector 351 may generate an output signal corresponding to NumPeaks S309 indicating a number of the maximum positive and negative peaks detected. The NumPeaks S309 may correspond to the NumPosPeaks S408 of FIG. 5 when the Sync Preamble Detector 351 corresponds to the first sync preamble detector 401 of FIG. 5. The NumPeaks S309 may correspond to the NumNegPeaks S413 of FIG. 5 when the Sync Preamble Detector 351 corresponds to the second sync preamble detector 402 of FIG. 5. The Sync Preamble Detector 351 may provide the NumPeaks S309 to the inversion detector 403 of FIG. 5.

The method illustrated in FIG. 6 also includes aggregating the correlation peaks, at 462. For example, the Sync Preamble Detector 351 may aggregate the maximum positive and negative peaks. To illustrate, the Sync Preamble Detector 351 may aggregate the maximum positive and negative peaks by summing their values to find a net value. The aggregated value may be indicated by the SignInd S312. The SignInd S312 may correspond to the SignPosInd S404 of FIG. 5 when the Sync Preamble Detector 351 corresponds to the first sync preamble detector 401 of FIG. 5. The SignInd S312 may correspond to the SignNegInd S409 of FIG. 5 when the Sync Preamble Detector 351 corresponds to the second sync preamble detector 402 of FIG. 5. The Sync Preamble Detector 351 may output the SignInd S312 signal, e.g., to the inversion detector 403 of FIG. 5.

The method illustrated in FIG. 6 further includes determining whether the aggregated value satisfies a particular threshold, at 463. For example, the Sync Preamble Detector 351 may determine whether the SignInd S312 satisfies (e.g., is less than) the particular threshold. The method in FIG. 6 may proceed to 458 in response to determining that the aggregated value satisfies the particular threshold.

The method illustrated in FIG. 6 also includes setting a synchronization flag to False, at 458. For example, the Sync Preamble Detector 351 may set the SyncFlag S305 to a particular value (e.g., False or 0) indicating that a synchronization preamble is not detected.

The method illustrated in FIG. 6 also includes determining whether a majority of peaks are detected, at 461. For example, the Sync Preamble Detector 351 may determine whether the number of peaks detected is a majority (e.g., more than half) of peaks of the expected pattern. An example of a majority of peaks detected is 4 detected peaks out of 5 peaks which match the expected pattern. In a particular example, the Sync Preamble Detector 351 may determine that a synchronization preamble is detected based on finding at least 2 peaks which match the expected pattern. In this example, the Sync Preamble Detector 351 may determine whether at least 2 peaks are detected, at 461. The method illustrated in FIG. 6 may proceed to 460 in response to determining that the majority of peaks are detected or that at least 2 peaks are detected.

The method illustrated in FIG. 6 further includes setting the synchronization flag to True, at 460. For example, the Sync Preamble Detector 351 may set the SyncFlag S305 to a particular value (e.g., True or 1) indicating that a synchronization preamble is detected in response to determining that the majority of peaks are detected or that at least 2 peaks are detected.

The method illustrated in FIG. 6 also includes, in response to determining that the majority of peaks are not detected or that at least two peaks are not detected, determining whether a temporal distance between the positive peaks is within range of an expected temporal distance (PeakDistT1), at 454. For example, Sync Preamble Detector 351 may, in response to determining that the majority of peaks are not detected or that at least two peaks are not detected, determine a temporal distance between the maximum positive peaks found. The Sync Preamble Detector 351 may compare the temporal distance with an expected distance (PeakDistT1) of the peaks as indicated by the expected pattern. For example, the PeakDistT1 may be a function of a period of the PN sequence 242. To illustrate, filtering a received synchronization preamble based on the PN sequence 242 may yield a temporal distance between the correlation peaks which is equal to some multiple of the period. An example range for PeakDistT1 is plus or minus 2 samples.

The method illustrated in FIG. 6 further includes, in response to determining that the temporal distance between the positive peaks is within the range of PeakDistT1, determining whether amplitudes of the positive peaks satisfy a particular amplitude threshold (e.g., PeakAmpT1), at 455. For example, the Sync Preamble Detector 351 may determine whether the amplitudes of the positive peaks satisfy (e.g., are greater than or equal to) the PeakAmpT1. The method illustrated in FIG. 6 may proceed to 460 in response to determining that the amplitudes of the positive peaks satisfy (e.g., are greater than or equal to) the PeakAmpT1. For example, the Sync Preamble Detector 351 may set the SyncFlag S305 to indicate that a synchronization preamble is detected in response to determining that the amplitudes of the positive peaks satisfy the PeakAmpT1.

In a particular aspect, the PeakAmpT1 may be a function of amplitudes of peaks found previously by the Sync Preamble Detector 351 at 453. For example, the Sync Preamble Detector 351 may set the PeakAmpT1 such that the positive peaks found at 453 do not differ in amplitude by more than a particular factor (e.g., 3) and that an average peak amplitude does not exceed a particular fraction (e.g., half) of a maximum peak amplitude observed up to that point. The method illustrated in FIG. 6 may proceed to 456 in response to determining that the temporal distance of the positive peaks is not within range of PeakDistT1 or in response to determining that the amplitudes of the positive peaks fail to satisfy the PeakAmpT1.

The method illustrated in FIG. 6 also includes determining whether a temporal distance between the negative peaks is within range of an expected temporal distance (PeakDistT2), at 456. For example, Sync Preamble Detector 351 may, in response to determining that the temporal distance of the positive peaks is not within range of PeakDistT1 or in response to determining that the amplitudes of the positive peaks fail to satisfy the PeakAmpT1, determine a negative temporal distance between the maximum negative peaks found at 453. The Sync Preamble Detector 351 may compare the negative temporal distance with an expected distance (PeakDistT2) of the negative peaks as indicated by the expected pattern. An example range for PeakDistT2 is plus or minus 2 samples. The PeakDistT2 may be a function of the period of the PN sequence 242.

The method illustrated in FIG. 6 further includes, in response to determining that the negative temporal distance is within range of the PeakDistT2, determining whether amplitudes of the negative peaks satisfy a negative amplitude threshold (PeakAmpT2), at 457. For example, the Sync Preamble Detector 351 may determine whether amplitudes of the negative peaks found at 453 satisfy (e.g., are greater than or equal to) the PeakAmpT2.

The Sync Preamble Detector 351 may set the PeakAmpT2 based on the amplitudes of negative peaks found at 453. The method illustrated in FIG. 6 may proceed to 460 in response to determining that the amplitudes of the negative peaks satisfy the PeakAmpT2. For example, the Sync Preamble Detector 351 may set the SyncFlag S305 to a particular value (e.g., True or 1) indicating that a synchronization preamble is detected in response to determining that the amplitudes of the negative peaks satisfy the PeakAmpT2.

The method illustrated in FIG. 6 may proceed to 458 in response to determining that the negative temporal distance is not within range of the PeakDistT2 or in response to determining that the amplitudes of the negative peaks fail to satisfy the PeakAmpT2. For example, the Sync Preamble Detector 351 may, in response to determining that the negative temporal distance is not within range of the PeakDistT2 or in response to determining that the amplitudes of the negative peaks fail to satisfy the PeakAmpT2, set the SyncFlag S305 to a particular value (e.g., False or 0) indicating that a synchronization preamble is not detected.

The Sync Preamble Detector 351 may output the SyncFlag S305, e.g., to the inversion detector 403. The SyncFlag S305 may correspond to the SyncPosFlag S405 of FIG. 5 when the Sync Preamble Detector 351 corresponds to the first sync preamble detector 401 of FIG. 5. The SyncFlag S305 may correspond to the SyncNegFlag S410 of FIG. 5 when the Sync Preamble Detector 351 corresponds to the second sync preamble detector 402 of FIG. 5.

It should be recognized that different orders and combinations of the steps of the illustrated method may achieve a similar result. For example, detecting the majority peaks at 461 may be performed subsequent to checking the temporal distance of the positive peaks at 454 and checking the amplitudes of the positive peaks at 455.

The method described with reference to FIG. 6 may enable the sync preamble detector 452 to output a number of peaks detected (e.g., the NumPeaks S309), an aggregated value of the peaks (e.g., SignInd S312), and a flag (e.g., the SyncFlag S305) indicating whether a synchronization preamble is detected. The NumPeaks S309, the SignInd S312, and the SyncFlag S305 may be provided to an inversion detector (e.g., the inversion detector 403 of FIG. 5) to determine whether codec inversion is detected. Thus, the method of FIG. 6 may facilitate detection of codec inversion.

In particular aspects, the method illustrated in FIG. 6 may be implemented via hardware (e.g., a field-programmable gate array (FPGA) device, an application-specific integrated circuit (ASIC), etc.) of a processing unit, such as a central processing unit (CPU), a digital signal processor (DSP), or a controller, via a firmware device, or any combination thereof. As an example, the method described with reference to FIG. 6 can be performed by a processor that executes instructions, as described with respect to FIG. 11.

Figure 7:
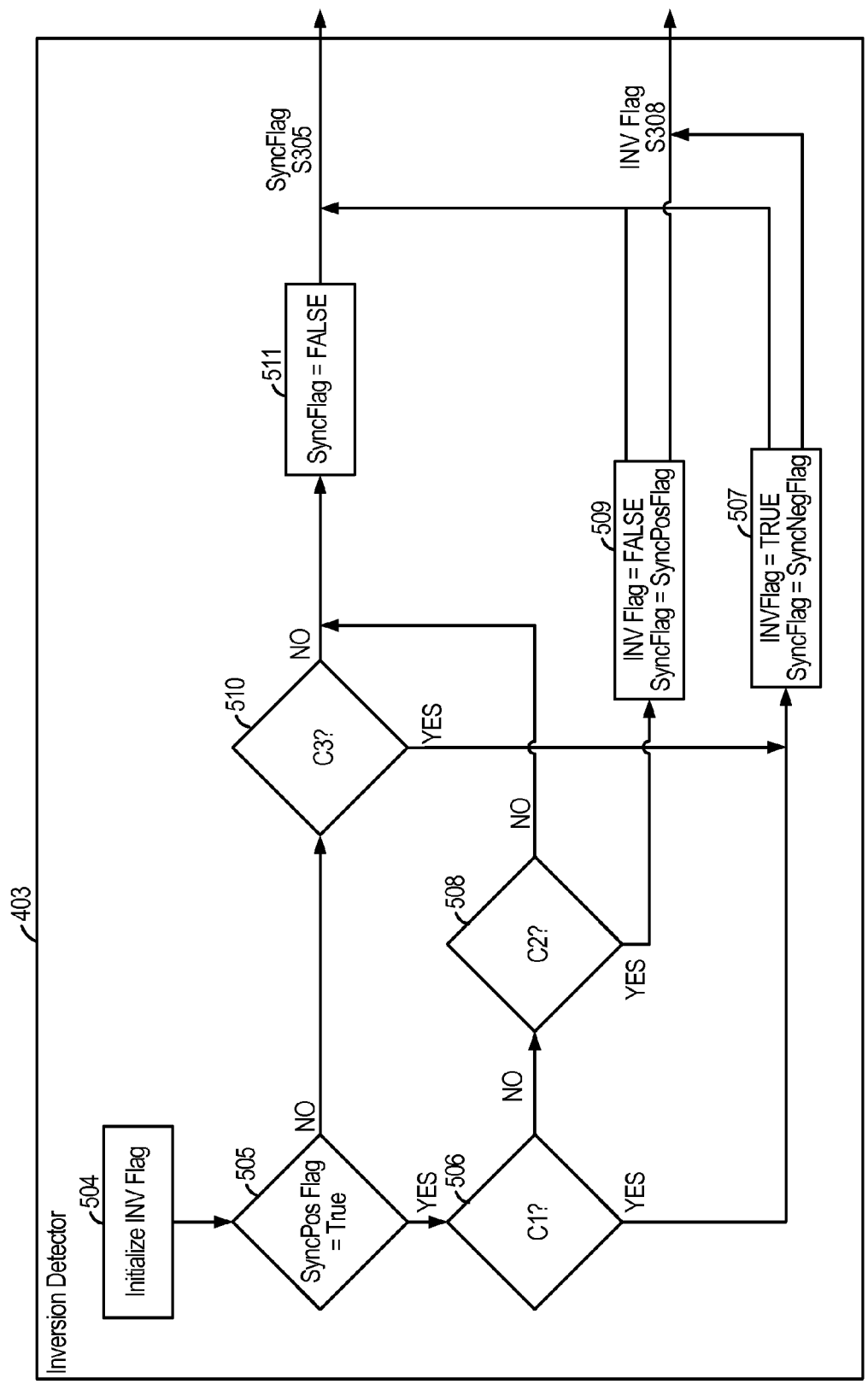
FIG. 7 is a flowchart to illustrate a particular example of a method of operation of an inversion detector. In a particular example, the inversion detector may be included in the synchronization preamble and inversion detector of FIG. 5.

Referring to FIG. 7, a flowchart of a particular example of a method of operation of an inversion detector is shown and generally designated 403. In a particular aspect, the inversion detector 403 may be included in the synchronization preamble and inversion detector 355 of FIG. 5. Pseudo code corresponding to a particular example of a method of operation of the inversion detector 403 is shown:

```
/*=========================================================*/
/* FUNCTION: Sync                                          */
/*---------------------------------------------------------*/
/*                                                         */
/* Description: main synchronization function             */
/*                                                         */
/* InOut: SyncState* sync <-> sync struct                 */
/* In: const Int16* pcm -> input frame                    */
/*     const char* caller -> modem identification         */
/*     Bool invert -> port inversion flag                 */
/*---------------------------------------------------------*/
void Sync(SyncState *sync, const Int16 *pcm,
const char *caller, Bool invert)
{
Int16 offset = syncIndexPreamble[SYNC_IDXLEN-1] + PCM_LENGTH +
2*NRS_CP;
/* set buffer pointers */
Int32 *posP = &sync->mem[offset + 0];
Int32 *posN = &sync->mem[offset + 9];
Int32 *corrP = &sync->mem[offset + 18];
Int32 *corrN = &sync->mem[offset + 27 + 9*2*NRS_CP];
/* test for 500 Hz or 800 Hz sine tone and run sync filter */
ToneDetect(sync, pcm);
SyncFilter(sync, pcm, invert);
/* copy data to subsystem */
SyncSubPut(sync, &sync->syncPos);
SyncSubPut(sync, &sync->syncNeg);
/* peak evaluation for each subsystem */
SyncSubRun(&sync->syncPos, caller, posP, corrP, posN, corrN);
SyncSubRun(&sync->syncNeg, caller, posN, corrN, posP, corrP);
if (sync->syncPos.flag || sync->syncNeg.flag) {
    LogInfo("[%-4s] Hallo log info: POS=%d, NEG=%d",caller, sync-
>syncPos.flag, sync->syncNeg.flag); }
/* decision logic */
if (sync->syncPos.flag ==True) {
  if (
      sync->syncNeg.flag == True &&
      (sync->syncNeg.npeaks >=4 || (sync->syncNeg.npeaks >=3 &&
      sync->syncPos.npeaks>0 )) &&
      sync->syncPos.sign <sync->syncNeg.sign &&
      sync->syncPos.sign <=0 &&
      sync->syncNeg.sign > 0
  ) /* Condition C1 */
  {
      sync->invert =True;
      sync->sign = sync->syncNeg.sign;
      sync->npeaksMem = sync->syncNeg.npeaks;
      SyncSubGet(sync, &sync->syncNeg);
      LogInfo([%-4s] sync detected; delay: %+4d; npeaks:
      %+4d; sign: %+4d,
      Pos.sign: %+4d, Neg.sign: %+4d (inverted sync)",
      caller, sync->delay, sync-
      >npeaksMem, sync->sign, sync->syncPos.sign, sync->syncNeg.sign);
  }
  else if(
      sync->invert ==False || (
      sync->syncPos.flag == True &&
      (sync->syncPos.npeaks >=4 || (sync->syncPos.npeaks >= 3
&&
          (sync->syncNeg.npeaks>0
          || sync->syncNeg.flag == False
          /* the "sync ->syncNeg.flag ==False" condition could
      be removed in another example*/
          ))) &&
      sync->syncPos.sign > 0 &&
      (sync->syncPos.sign > sync->syncNeg.sign &&
      sync->syncNeg.sign <= 0 ||
          sync->syncNeg.flag == False)
  )) /* Condition C2 */
  {
      sync->invert = False;
      sync->sign = sync->syncPos.sign;
      sync->npeaksMem = sync->syncPos.npeaks;
      SyncSubGet(sync, &sync->syncPos);
      LogInfo("[%-4s] sync detected; delay: %+4d;
      npeaks: %+4d; sign: %+4d,
      Pos.sign: %+4d, Neg.sign: %+4d (regular sync)",
      caller, sync->delay, sync-
      >npeaksMem, sync->sign, sync->syncPos.sign, sync->syncNeg.sign);
  }
  else {
      sync->flag = False;
  }
}
else if (
    sync->syncNeg.flag == True &&
    ( sync->invert == True || (
    (sync->syncNeg.npeaks >= 4 || (sync->syncNeg.npeaks >= 3 &&
    sync->syncPos.npeaks>0)) &&
    sync->syncNeg.sign > 0
    ))
    ) /* Condition C3 */
{
    sync->invert = True;
    sync->sign = sync->syncNeg.sign;
    sync->npeaksMem = sync->syncNeg.npeaks;
    SyncSubGet(sync, &sync->syncNeg);
    LogInfo("[%-4s] sync detected; delay: %+4d; npeaks:
    %+4d; sign: %+4d, Pos.sign:
    %+4d, Neg.sign: %+4d (inverted sync)",caller,
    sync->delay, sync->npeaksMem,
    sync->sign, sync->syncPos.sign, sync->syncNeg.sign);
}
else {
    sync->flag = False;
}
if (sync->flag == True) {
    SyncSubReset(&sync->syncPos);
    SyncSubReset(&sync->syncNeg);
}
}
```

The method illustrated in FIG. 7 includes initializing an INV flag, at 504. For example, the inversion detector 403 may initialize the INV Flag S308 to a particular value (e.g., False or 0) to indicate that codec inversion is not detected, to a particular value (e.g., True or 1) to indicate that codec inversion is detected, or to a neutral value (e.g., −1) that does not favor any initial precondition. In a particular implementation, initializing the INV Flag S308 to a first value (e.g., True or 1) to indicate that codec inversion is detected may improve performance when codec inversion is detected. Similarly, initializing the INV Flag S308 to a second value (e.g., False or 0) to indicate that codec inversion is not detected may improve performance when codec inversion is not detected. For example, in the pseudo code provided above, conditions C2 and C3 are satisfied based on values of "sync→invert," and performance of detection of synchronization inversion may therefore be improved via initialization of sync→invert to one of "True" or "False".

The method illustrated in FIG. 7 also includes determining whether a SyncPos Flag is set to True, at 505. For example, the inversion detector 403 may determine whether SyncPosFlag S405 of FIG. 5 has a particular value (e.g., True or 1). To illustrate, the particular value of the SyncPosFlag S405 may indicate that the first sync preamble detector 401 of FIG. 5 detected a sync preamble in the Vocoder Decoder Output S370, as described with reference to FIGS. 5-6.

The method illustrated in FIG. 7 further includes, in response to determining that the SyncPos Flag is set to True, at 505, determining whether a first condition (C1) is satisfied, at 506. For example, the inversion detector 403 may determine whether the first condition (C1) is satisfied in response to determining that the SyncPosFlag S405 is set to the particular value (e.g., True or 1). In a particular example, the inversion detector 403 may determine whether the first condition (C1) is satisfied based on the SyncNegFlag S410, NumNegPeaks S413, NumPosPeaks S408, SignPosInd S404, SignNegInd S409 of FIG. 5, or a combination thereof.

For example, the inversion detector 403 may determine that the first condition (C1) is satisfied based on determining that the SyncNegFlag S410 is set to a first negative flag value (e.g., True or 1), that the NumNegPeaks S413 satisfies (e.g., is greater than or equal to) a first threshold (e.g., 4), that the SignPosInd S404 is less than the SignNegInd S409, that the SignPosInd S404 is less than or equal to zero, and that the SignNegInd S409 is positive.

The first negative flag value of the SyncNegFlag S41 may indicate that a sync preamble is not detected by the second sync preamble detector 402 in an inverted version of the vocoder decoder output S370, as described with reference to FIGS. 5-6.

As another example, the inversion detector 403 may determine that the first condition (C1) is satisfied based on determining that the SyncNegFlag S410 is set to the first negative flag value (e.g., True or 1), that the NumNegPeaks S413 satisfies (e.g., is greater than or equal to) a second threshold (e.g., 3), that the NumPosPeaks S408 is positive, that the SignPosInd S404 is less than the SignNegInd S409, that the SignPosInd S404 is less than or equal to zero, and that the SignNegInd S409 is positive.

The method illustrated in FIG. 7 also includes, in response to determining that the first condition (C1) is satisfied, at 506, setting the INV flag to True and setting the SyncFlag to SyncNegFlag, at 507. For example, the inversion detector 403 may, in response to determining that the first condition (C1) is satisfied, set the INV Flag S308 to a particular value (e.g., True or 1) indicating that codec inversion is detected. The inversion detector 403 may set the SyncFlag S305 to the SyncNegFlag S410. For the first condition (C1) to be satisfied, SyncNegFlag S410 may have a particular value (e.g., True or 1) indicating that a sync preamble is detected. The inversion detector 403 may set the SyncFlag S305 to a particular value (e.g., True or 1) to indicate that the sync preamble is detected in response to determining that the first condition (C1) is satisfied.

The method illustrated in FIG. 7 further includes, in response to determining that the first condition (C1) is not satisfied, at 506, determining whether a second condition (C2) is satisfied, at 508. For example, the inversion detector 403 may determine whether the second condition (C2) is satisfied in response to determining that the first condition (C1) is not satisfied. In a particular aspect, the inversion detector 403 may determine whether the second condition (C2) is satisfied based on the SyncNegFlag S410, NumNegPeaks S413, NumPosPeaks S408, SignPosInd S404, SignNegInd S409 of FIG. 5, or a combination thereof.

For example, the inversion detector 403 may determine that the second condition (C2) is satisfied in response to determining that the NumPosPeaks S408 satisfies (e.g., is greater than or equal to) a first threshold (e.g., 4), determining that the SignPosInd S404 is positive, and determining that the SignPosInd S404 is greater than the SignNegInd S409 and the SignNegInd S409 is less than zero or that the SyncNegFlag S410 indicates a particular value (e.g., False or 0) indicating that codec inversion is not detected by the second sync preamble detector 402.

As another example, the inversion detector 403 may determine that the second condition (C2) is satisfied in response to determining that the NumPosPeaks S408 satisfies (e.g., is greater than or equal to) a particular threshold (e.g., 3), determining that NumNegPeaks S413 is positive or that the SyncNegFlag S410 indicates a particular value (e.g., False or 0) indicating that codec inversion is not detected by the second sync preamble detector 402, determining that the SignPosInd S404 is positive, and determining that the SignPosInd S404 is greater than the SignNegInd S409 and the SignNegInd S409 is less than zero or that the SyncNegFlag S410 indicates the particular value (e.g., False or 0) indicating that codec inversion is not detected by the second sync preamble detector 402.

As an additional example, the inversion detector 403 may determine that the second condition (C2) is satisfied in response to determining that the NumPosPeaks S408 satisfies (e.g., is greater than or equal to) a particular threshold (e.g., 3), determining that NumNegPeaks S413 is positive, determining that the SignPosInd S404 is positive, and determining that the SignPosInd S404 is greater than the SignNegInd S409 and the SignNegInd S409 is less than zero or that the SyncNegFlag S410 indicates the particular value (e.g., False or 0) indicating that codec inversion is not detected by the second sync preamble detector 402.

The method illustrated in FIG. 7 also includes, in response to determining that the second condition (C2) is satisfied, setting the INV flag to False and setting the SyncFlag to SyncPosFlag, at 509. For example, the inversion detector 403 may set the INV Flag S308 of FIG. 5 to a particular value (e.g., False or 0) indicating that codec inversion is not detected in response to determining that the second condition (C2) is satisfied. The inversion detector 403 may set the SyncFlag S305 to SyncPosFlag S405 (e.g., True or 1). For the second condition (C2) to be satisfied, SyncPosFlag S405 may have a particular value (e.g., True or 1) indicating that a sync preamble is detected. The inversion detector 403 may set the SyncFlag S305 to a particular value (e.g., True or 1) to indicate that the sync preamble is detected in response to determining that the second condition (C2) is satisfied.

The method illustrated in FIG. 7 further includes, in response to determining that the second condition (C2) is not satisfied, at 508, setting the SyncFlag to False, at 511. For example, the inversion detector 403 may, in response to determining that the second condition (C2) is not satisfied, set the SyncFlag S305 to a particular value (e.g., False or 0) indicating that a sync preamble is not detected.

The method illustrated in FIG. 7 also includes, in response to determining that the SyncPos Flag is not set to True, determining whether a third condition (C3) is satisfied at

510. For example, the inversion detector 403 may determine whether the third condition (C3) is satisfied in response to determining that the SyncPosFlag S405 is set to a particular value (e.g., False or 0) indicating that the first sync preamble detector 401 did not detect a sync preamble in the vocoder decoder output S370. In a particular aspect, the inversion detector 403 may determine whether the third condition (C3) is satisfied based on the SyncNegFlag S410, the NumNegPeaks S413, the NumPosPeaks S408, the SignNegInd S409 of FIG. 5, or a combination thereof.

For example, the inversion detector 403 may determine that the third condition (C3) is satisfied in response to determining that the SyncNegFlag S410 indicates a particular value (e.g., True or 1) indicating that the second sync preamble detector 402 of FIG. 5 detected codec inversion in an inverted version of the vocoder decoder output S370, determining that the NumNegPeaks S413 satisfies (e.g., is greater than or equal to) a particular threshold (e.g., 4), and determining that the SignNegInd S409 is positive.

As another example, the inversion detector 403 may determine that the third condition (C3) is satisfied in response to determining that the SyncNegFlag S410 indicates a particular value (e.g., True or 1) indicating that the second sync preamble detector 402 of FIG. 5 detected codec inversion in an inverted version of the vocoder decoder output S370, determining that the NumNegPeaks S413 satisfies (e.g., is greater than or equal to) a particular threshold (e.g., 3), determining that NumPosPeaks S408 is positive, and determining that the SignNegInd S409 is positive.

The method illustrated in FIG. 7 may proceed to 511 in response to determining that the third condition (C3) is not satisfied. For example, the inversion detector 403 may, in response to determining that the third condition (C3) is not satisfied, set the SyncFlag S305 to a particular value (e.g., False or 0) indicating that a sync preamble is not detected.

Alternatively, the method illustrated in FIG. 7 may proceed to 507 in response to determining that the third condition (C3) is satisfied. For example, the inversion detector 403 may, in response to determining that the third condition (C3) is satisfied, set the SyncFlag S305 to the SyncNegFlag S410 and may set the INV Flag S308 to a particular value (e.g., True or 1) indicating that codec inversion is detected. For the third condition (C3) to be satisfied, SyncNegFlag S410 may have a particular value (e.g., True or 1) indicating that a sync preamble is detected. The inversion detector 403 may set the SyncFlag S305 to a particular value (e.g., True or 1) to indicate that the sync preamble is detected in response to determining that the third condition (C3) is satisfied.

The inversion detector 403 may output the SyncFlag S305, e.g., to the Sync Detector Controller 370 of FIG. 4. The SyncFlag S305 may indicate whether a synchronization preamble is detected. The inversion detector 403 may output the INV Flag S308, e.g., to the Rx data modem 330 of FIG. 1. The INV Flag S308 may indicate whether codec inversion is detected.

The method described with reference to FIG. 7 may enable detection of codec inversion in the vocoder decoder output S370. The inversion detector 403 may provide the INV Flag S308 to the Rx data modem 330 of FIG. 1 that indicates whether codec inversion is detected. If codec inversion is detected, the Rx data modem 330 may address the codec inversion by inverting the adjusted Rx data S330 prior to generating the Rx message S320. Thus, the Rx data modem 330 may be able to correct the error instead of generating an erroneous Rx message S320. In an emergency application, a quick response time may be advantageous. The system 102 may be able to respond faster by correcting the error in the vocoder decoder output S370 instead of waiting to receive an additional signal that is not inverted.

In particular aspects, the method illustrated in FIG. 7 may be implemented via hardware (e.g., an FPGA device, an ASIC, etc.) of a processing unit, such as a CPU, a DSP, or a controller, via a firmware device, or any combination thereof. As an example, the method described with reference to FIG. 7 can be performed by a processor that executes instructions, as described with respect to FIG. 11.

Figure 8:
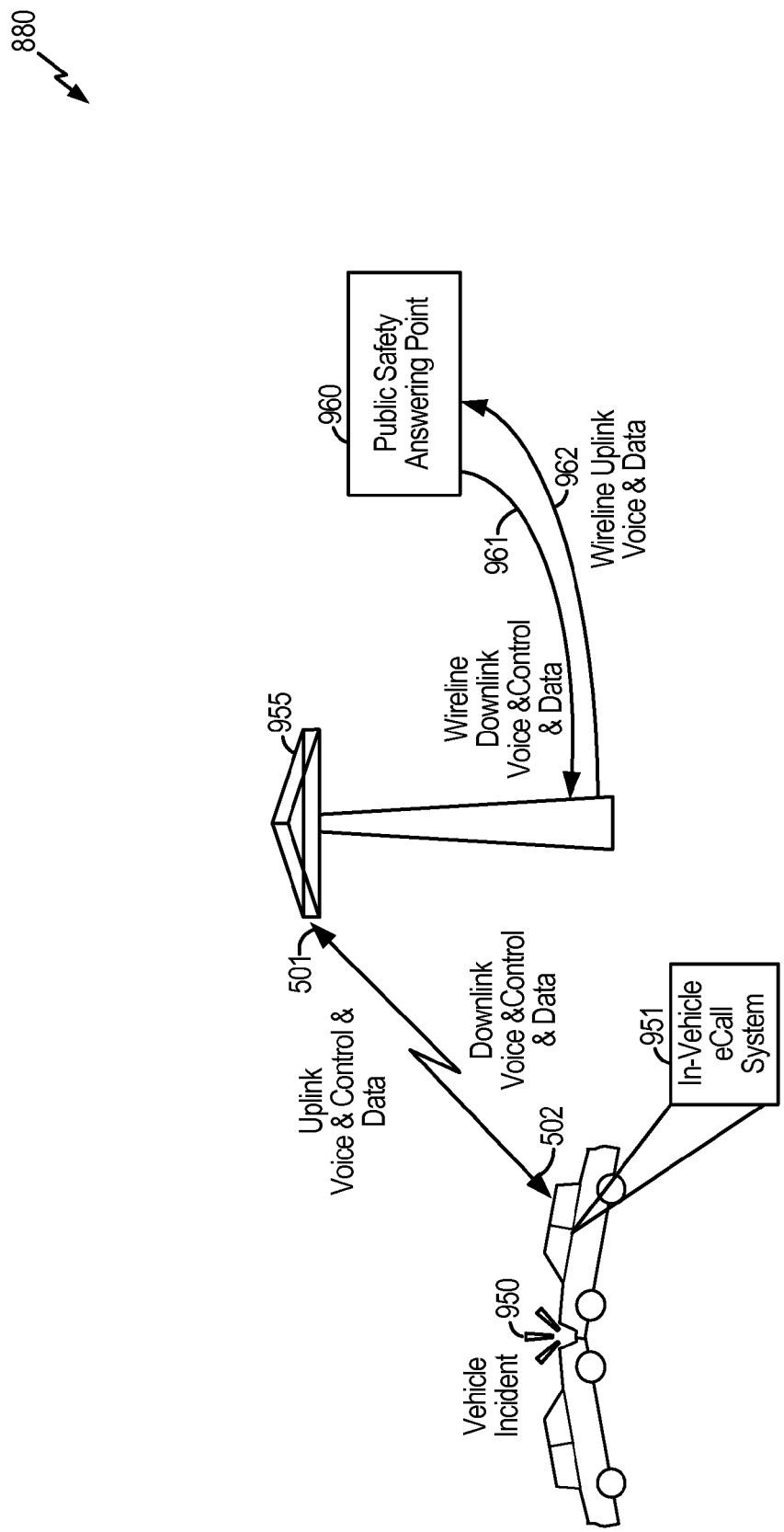
FIG. 8 is a diagram of a particular example of an in-vehicle eCall system.

Referring to FIG. 8, a particular example of an in-vehicle eCall system is shown and generally designated 880. In a particular aspect, one or more components of the system 880 may correspond to, may include, or may be included in, one or more components of the system 102 of FIG. 1.

FIG. 8 illustrates a vehicle incident 950 as an accident between two vehicles. Other examples of the vehicle incident 950 include a multiple vehicle accident, a single vehicle accident, a single vehicle flat tire, a single vehicle engine malfunction, or other situations where a vehicle malfunctions or a user of the vehicle is in need of assistance. An in-vehicle eCall system 951 may be located in one or more of the vehicles involved in the vehicle incident 950, may be located on the user, or both.

The in-vehicle eCall system 951 may include, or correspond to, the source terminal 100 of FIG. 1. The in-vehicle eCall system 951 may communicate over a wireless communication channel, which may include an uplink communications channel (e.g., the communication channel 501) and a downlink communications channel (e.g., the communication channel 502). The in-vehicle eCall system 951 may receive a request for data transmission through the wireless communication channel.

In a particular aspect, the in-vehicle eCall system 951 may automatically generate the request for data transmission in response to detecting the vehicle incident 950. For example, the in-vehicle eCall system 951 may detect the vehicle incident 950 in response to determining that a safety sensor (e.g., an impact sensor), a safety device (e.g., an airbag), or both, of the vehicle have been activated. In a particular aspect, the in-vehicle eCall system 951 may receive the request for data transmission in response to a user input from the user. For example, the user may press a button, speak a command, or provide other input (e.g., via touch screen, via a mobile device, or both), to provide the request for data transmission to the in-vehicle eCall system 951.

A wireless tower 955 may receive a transmission from the in-vehicle eCall system 951 and may interface to a wireline network. The wireline network may include a wireline uplink 962 and a wireline downlink 961. An example of the wireless tower 955 includes a cellular telephone communications tower comprised of antennas, transceivers, and backhaul equipment for interfacing to a wireless uplink (e.g., the communication channel 501) and a wireless downlink (e.g., the communication channel 502). The wireline network may interface to a PSAP 960, where emergency information transmitted by the in-vehicle eCall system 951 may be received and control and data transmitted. In a particular aspect, the Public Safety Answering Point 960 may include, or correspond to, the destination terminal 600 of FIG. 1. An example of the communication between the in-vehicle eCall system 951 and the Public Safety Answering Point 960 is described with reference to FIG. 9.

Figure 9:
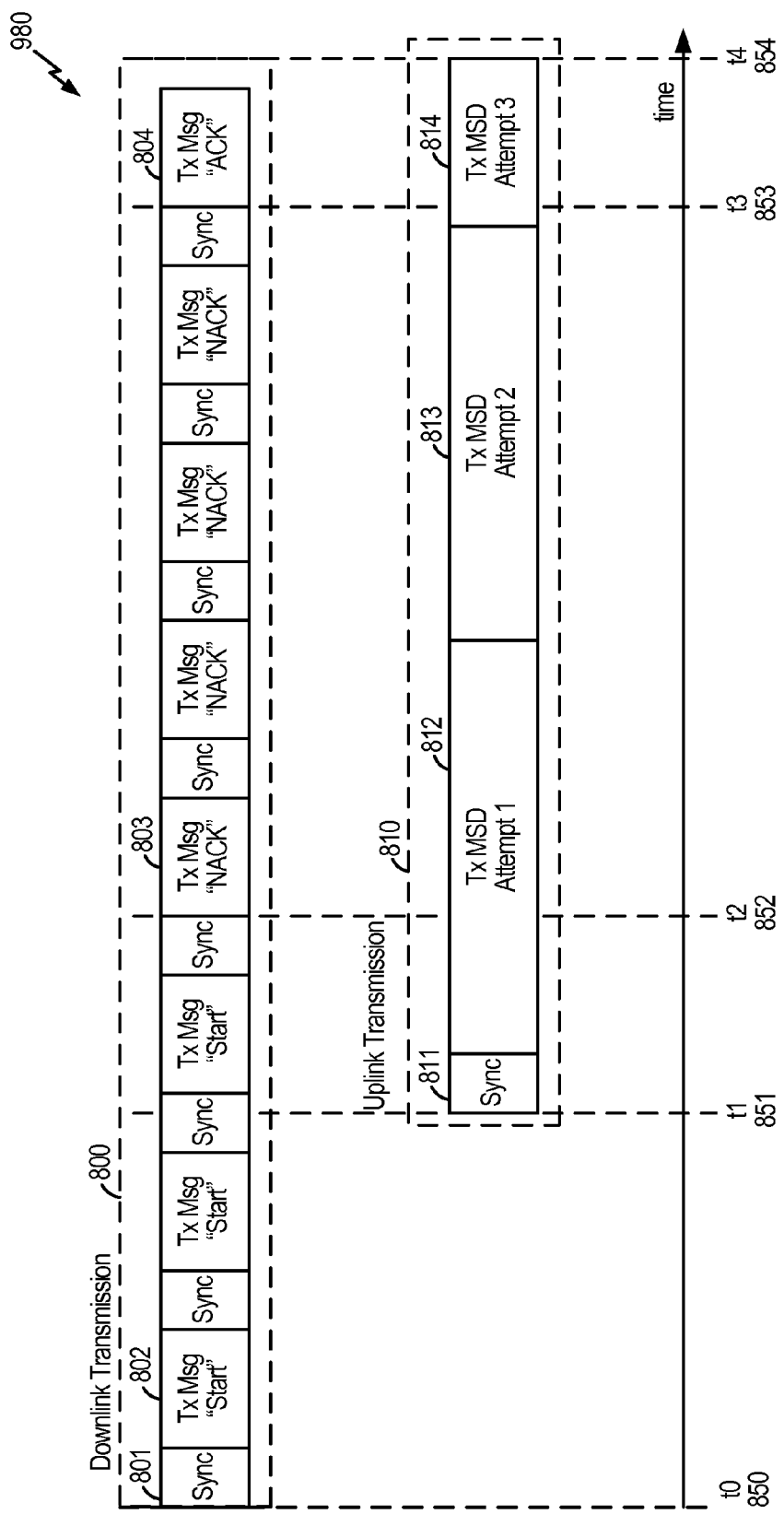
FIG. 9 is a diagram to illustrate a particular example of an interaction that may take place in the system of FIG. 1.

Referring to FIG. 9, a particular example of an interaction is shown and generally designated 980. In a particular aspect, the interaction 980 may take place between the source terminal 100 and the destination terminal 600 of FIG. 1.

The interaction 980 includes an Uplink Transmission sequence 810 and a Downlink Transmission sequence 800. The Downlink Transmission sequence 800 corresponds to transmission of sync and data messages from the Destination Terminal 600 to the Source Terminal 100 and the Uplink Transmission sequence 810 corresponds to transmission of sync and data messages from the Source Terminal 100 to the Destination Terminal 600. The Uplink Transmission sequence 810 may be initiated by the Destination Terminal 600.

The Destination Terminal 600 may initiate the Downlink Transmission sequence 800 at time t0 850 with a sync sequence 801 (e.g., the Tx data S230 as described with reference to FIG. 1). Following the sync sequence 801, the Destination Terminal 600 may transmit a "Start" message 802 to request the Source Terminal 100 to begin transmitting the Uplink Transmission sequence 810. The Destination Terminal 600 may continue to transmit an alternating sync sequence 801 and "Start" message 802 and may wait for a response from the Source Terminal 100.

At time t1 851 the Source Terminal 100, having received the "Start" message 802 from the Destination Terminal 600, may begin transmitting a sync sequence 811 e.g., the Tx data S230 as described with reference to FIG. 1). In response to receiving the sync sequence 811, the Source Terminal 100 may transmit a minimum set of data or "MSD" message 812 to the Destination Terminal 600. An example of the MSD message 812 includes sensor or user data formatted by the data message formatter 210 of FIG. 1.

At time t2 852 the Destination Terminal 600, having received the sync sequence 811 from the Source Terminal 100, may begin transmitting a negative acknowledgement or "NACK" message 803 to the Source Terminal 100. The Destination Terminal 600 may continue to transmit an alternating sync sequence 801 and "NACK" message 803 until the Destination Terminal 600 successfully receives the MSD message 812 from the Source Terminal 100. The Destination Terminal 600 may determine that the MSD message 812 is successfully received in response to verifying a cyclic redundancy check performed on the MSD message 812.

At time t3 853, the Destination Terminal 600, having successfully received the MSD message 812, may begin transmitting an alternating sync sequence 801 and acknowledge or "ACK" message 804. The Source Terminal 100 may attempt to send the MSD message 812 multiple times (813, 814) until the Source Terminal 100 receives the "ACK" message 804.

In a particular aspect, if the Source Terminal 100 attempts to send the MSD message 812 more than 8 times where each attempt is a different redundancy version, the Source Terminal 100 may switch to a more robust modulation scheme. An example of a more robust modulation scheme includes increasing a duration of a modulation frame TMF while maintaining a constant number of time instances. At time t4 854 the Source Terminal 100, having received the "ACK" message 804 from the Destination Terminal 600 may discontinue transmission of the MSD message 814. In a particular example, the Destination Terminal 600 may request a retransmission by transmitting the start message 802 again after a predetermined number of "ACK" messages 804 have been sent by the Destination Terminal 600.

Figure 10:
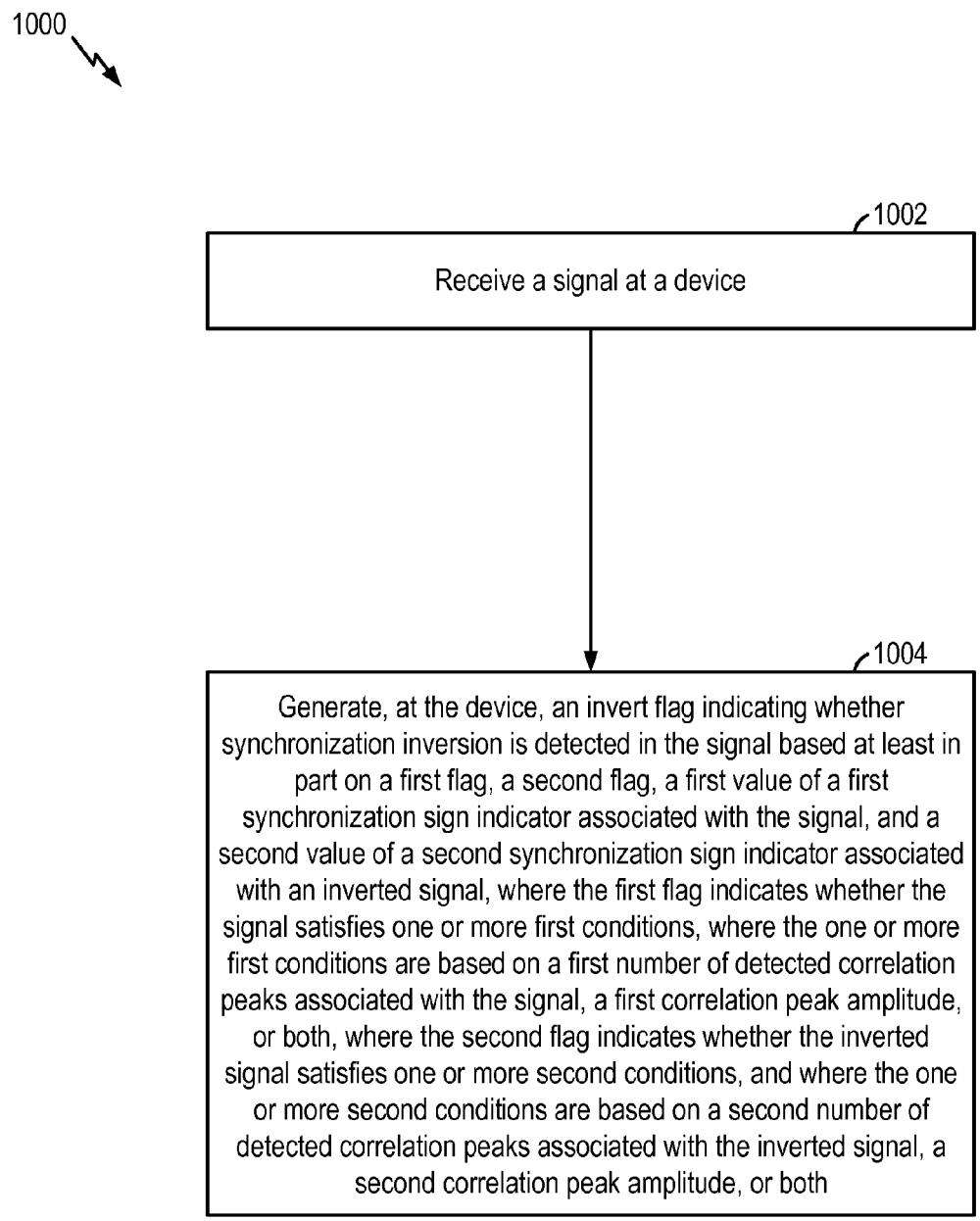
FIG. 10 is a flow chart of a particular illustrative aspect of a method of synchronization inversion detection.

Referring to FIG. 10, an illustrative aspect of a method of synchronization inversion detection is shown and generally designated 1000. The method 1000 may be performed by the system 102, the receive baseband 400, the sync detector and Rx control 350 of FIG. 1, the Sync Preamble and Inversion Detector 355 of FIG. 4, the first sync preamble detector 401, the second sync preamble detector 402, the inversion detector 403 of FIG. 5, the Sync Preamble Detector 351 of FIG. 6, the in-vehicle eCall system 951, the PSAP 960 of FIG. 8, or a combination thereof.

The method 1000 includes receiving a signal, at 1002. For example, the receiver 495 may receive packets over the communication channel 502, as described with reference to FIG. 1. The receiver 495 may provide the packets to the vocoder decoder 390 of FIG. 1. The vocoder decoder 390 may generate vocoder decoder output S370 by decoding the packets. The vocoder decoder 390 may provide the vocoder decoder output S370 to the sync detector and Rx control 350.

The method 1000 also includes generating, at the device, an invert flag indicating whether synchronization inversion is detected in the signal based at least in part on a first flag, a second flag, a first value of a first synchronization sign indicator associated with the signal, and a second value of a second synchronization sign indicator associated with an inverted signal, at 1104. For example, the inversion detector 403 may generate the INV flag S308 indicating whether synchronization inversion is detected in the vocoder decoder output S370 based at least in part on the SyncPosFlag S405, the SyncNegFlag S410, a first value of the SignPosInd S404 associated with the vocoder decoder output S370, and a second value of the SignNegInd S409 associated with an inverted version of the vocoder decoder output S370, as described with reference to FIG. 5.

The first flag (e.g., the SynPosFlag S405) may indicate whether the signal (e.g., corresponding to the vocoder decoder output S370) satisfies one or more first conditions, as described with reference to FIG. 6. The one or more first conditions may be based on a first number of detected correlation peaks associated with the signal, a first correlation peak amplitude, or both. For example, the Sync Preamble Detector 351 may determine whether the number of peaks detected is a majority of peaks of an expected pattern, as described with reference to FIG. 6. As another example, the Sync Preamble Detector 351 may determine whether amplitudes of positive peaks satisfy a particular amplitude threshold (e.g., PeakAmpT1), whether amplitudes of negative peaks satisfy a particular amplitude threshold (e.g., PeakAmpT2), or both, as described with reference to FIG. 6.

The second flag (e.g., the SyncNegFlag S410) may indicate whether the inverted signal (e.g., corresponding to an inverted version of the vocoder decoder output S370) satisfies one or more second conditions, as described with reference to FIG. 6. The one or more second conditions may be based on a second number of detected correlation peaks associated with the inverted signal, a second correlation peak amplitude, or both. For example, the Sync Preamble Detector 351 may determine whether the number of peaks detected is a majority of peaks of an expected pattern, as described with reference to FIG. 6. As another example, the Sync Preamble Detector 351 may determine whether amplitudes of positive peaks satisfy a particular amplitude threshold (e.g., PeakAmpT1), whether amplitudes of negative peaks satisfy a particular amplitude threshold (e.g., PeakAmpT2), or both, as described with reference to FIG. 6.

The method 1000 may thus enable synchronization inversion detection in the vocoder decoder output S370. The inversion detector 403 may provide the INV Flag S308 to the Rx data modem 330 of FIG. 1 that indicates whether synchronization inversion is detected. If synchronization inversion is detected, the Rx data modem 330 may address the synchronization inversion by inverting the adjusted Rx data S330 prior to generating the Rx message S320. Thus, the Rx data modem 330 may be able to correct the error instead of generating an erroneous Rx message S320. In an emergency application, a quick response time may be advantageous. The system 102 may be able to respond faster by correcting the error in the vocoder decoder output S370 instead of waiting to receive an additional signal that is not inverted.

In particular aspects, the method illustrated in FIG. 10 may be implemented via hardware (e.g., a field-programmable gate array (FPGA) device, an application-specific integrated circuit (ASIC), etc.) of a processing unit, such as a central processing unit (CPU), a digital signal processor (DSP), or a controller, via a firmware device, or any combination thereof. As an example, the method described with reference to FIG. 10 can be performed by a processor that executes instructions, as described with respect to FIG. 11.

Figure 11:
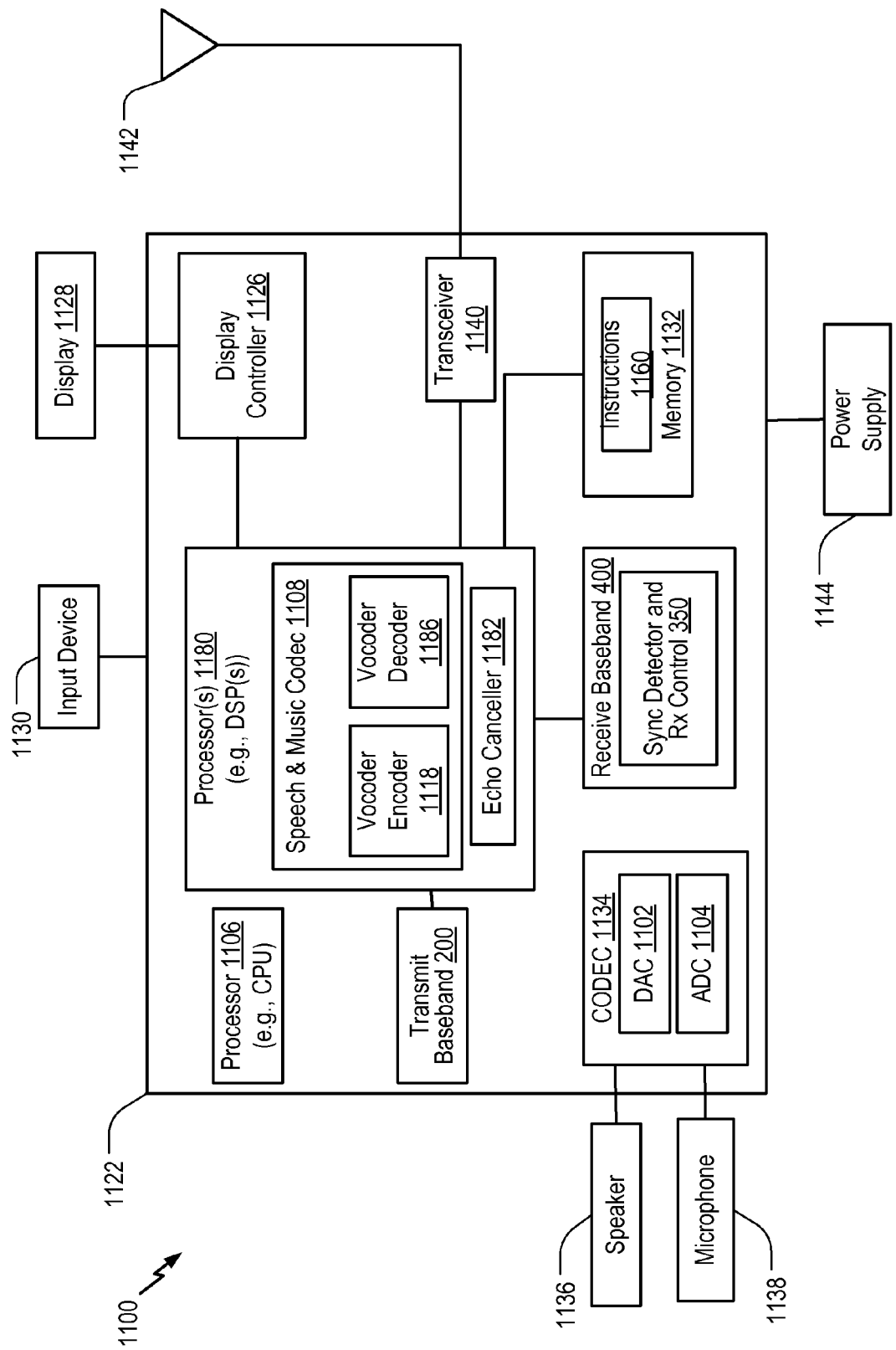
FIG. 11 is a block diagram of a device operable to detect codec inversion in accordance with the systems and methods of FIGS. 1-10.

Referring to FIG. 11, a block diagram of a particular illustrative example of a device (e.g., an in-vehicle eCall system or a PSAP) is depicted and generally designated 1100. In various examples, the device 1100 may have fewer or more components than illustrated in FIG. 11. In an illustrative example, the device 1100 may correspond to the source terminal 100 or the destination terminal 600 of FIG. 1. In an illustrative example, the device 1100 may perform one or more operations described with reference to FIGS. 1-10.

In a particular aspect, the device 1100 includes a processor 1106 (e.g., a CPU). The device 1100 may include one or more additional processors 1180 (e.g., one or more digital signal processors (DSPs)). The processors 1180 may include a speech and music coder-decoder (CODEC) 1108 and an echo canceller 1182. The speech and music CODEC 1108 may include a vocoder encoder 1118, a vocoder decoder 1186, or both. In a particular aspect, the vocoder encoder 1118 may correspond to the vocoder encoder 270 of FIG. 1. In a particular aspect, the vocoder decoder 1186 may correspond to the vocoder decoder 390 of FIG. 1.

The device 1100 may include a memory 1132 and a CODEC 1134. In a particular aspect, the memory 1132 may correspond to the memory 352 of FIG. 4. The device 1100 may include a transceiver 1140 coupled to an antenna 1142. In a particular aspect, the transceiver 1140 may include the transmitter 295, the receiver 495, or both, of FIG. 1. In a particular aspect, the antenna 1142 may correspond to the antenna 296 of FIG. 1. The device 1100 may include a display 1128 coupled to a display controller 1126. A speaker 1136, a microphone 1138, or both, may be coupled to the CODEC 1134. The CODEC 1134 may include a digital-to-analog converter (DAC) 1102 and an analog-to-digital converter (ADC) 1104.

In a particular aspect, the CODEC 1134 may receive analog signals from the microphone 1138, convert the analog signals to digital signals using the analog-to-digital converter 1104, and provide the digital signals to the speech and music codec 1108. The speech and music codec 1108 may process the digital signals. In a particular aspect, the speech and music codec 1108 may provide digital signals to the CODEC 1134. The CODEC 1134 may convert the digital signals to analog signals using the digital-to-analog converter 1102 and may provide the analog signals to the speaker 1136.

The device 1100 may include the receive baseband 400, the transmit baseband 200, or both, of FIG. 1. In a particular aspect, one or more components of the receive baseband 400, the transmit baseband 200, or both, may be included in the processor 1106, the processors 1180, the speech and music codec 1108, the CODEC 1134, the transceiver 1140, or a combination thereof.

The memory 1132 may include instructions 1160 executable by the processor 1106, the processors 1180, the CODEC 1134, the receive baseband 400, the transmit baseband 200, one or more other processing units of the device 1100, or a combination thereof, to perform methods and processes disclosed herein, such as the method of FIG. 6, the method of FIG. 7, the method of FIG. 10, or a combination thereof.

One or more components of the system 102 may be implemented via dedicated hardware (e.g., circuitry), by a processor executing instructions to perform one or more tasks, or a combination thereof. As an example, the memory 1132 or one or more components of the speech and music CODEC 1108 may be a memory device, such as a RAM, magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 1160) that, when executed by a computer (e.g., a processor in the CODEC 1134, the processor 1106, and/or the processors 1180), may cause the computer to perform at least a portion of one of the methods of FIG. 6, FIG. 7, or FIG. 10. As an example, the memory 1132 or the one or more components of the speech and music CODEC 1108 may be a non-transitory computer-readable medium that includes instructions (e.g., the instructions 1160) that, when executed by a computer (e.g., a processor in the CODEC 1134, the processor 1106, and/or the processors 1180), cause the computer perform at least a portion of the methods of FIG. 6, FIG. 7, or FIG. 10.

In a particular aspect, the device 1100 may be included in a system-in-package or system-on-chip device (e.g., a mobile station modem (MSM)) 1122. In a particular aspect, the processor 1106, the processors 1180, the display controller 1126, the memory 1132, the CODEC 1134, the transmit baseband 200, the receive baseband 400, and the transceiver 1140 are included in a system-in-package or the system-on-chip device 1122. In a particular aspect, an input device 1130, such as a touchscreen and/or keypad, and a power supply 1144 are coupled to the system-on-chip device 1122. Moreover, in a particular aspect, as illustrated in FIG. 11, the display 1128, the input device 1130, the speaker 1136, the microphone 1138, the antenna 1142, and the power supply 1144 are external to the system-on-chip device 1122. However, each of the display 1128, the input device 1130, the speaker 1136, the microphone 1138, the antenna 1142, and the power supply 1144 can be coupled to a component of the system-on-chip device 1122, such as an interface or a controller.

The device 1100 may include an in-vehicle eCall system, a PSAP, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a decoder system, or any combination thereof.

In an illustrative aspect, the processors 1180 may be operable to perform all or a portion of the methods or operations described with reference to FIGS. 1-10. For example, the transceiver 1140 may receive a signal. The sync detector and Rx control 350 of the receive baseband 400 may determine whether codec inversion is detected in the signal.

In a particular aspect, the microphone 1138 may capture an audio signal. The ADC 1104 may convert the captured audio signal from an analog waveform into a digital waveform comprised of digital audio samples. The processors 1180 may process the digital audio samples. A gain adjuster may adjust the digital audio samples. The echo canceller 1182 may reduce echo that may have been created by an output of the speaker 1136 entering the microphone 1138.

The vocoder encoder 1118 may compress digital audio samples corresponding to the processed speech signal and may form a transmit packet (e.g. a representation of the compressed bits of the digital audio samples). The transmit packet may be stored in the memory 1132. The transceiver 1140 may modulate some form of the transmit packet (e.g., other information may be appended to the transmit packet) and may transmit the modulated data via the antenna 1142.

As a further example, the antenna 1142 may receive incoming packets that include a receive packet. The receive packet may be sent by another device via a network. The vocoder decoder 1186 may uncompress the receive packet. The uncompressed receive packet may be referred to as reconstructed audio samples. The echo canceller 1182 may remove echo from the reconstructed audio samples. A gain adjuster may amplify or suppress an output of the echo canceller 1182. The DAC 1102 may convert an output of the gain adjuster from a digital signal to an analog signal and may provide the converted signal to the speaker 1136.

In conjunction with the described aspects, an apparatus is disclosed that includes means for receiving a signal. For example, the means for receiving the signal may include the receiver 495 of FIG. 1, one or more devices configured to receive the signal (e.g., a processor executing instructions at a non-transitory computer readable storage medium), or any combination thereof.

The apparatus also includes means for generating a first flag and a first measure. The first flag may indicate whether a synchronization preamble is detected in the signal. The first measure may be generated by aggregating correlation peaks that correspond to the signal. For example, the means for generating the first flag and the first measure may include the first sync preamble detector 401 of FIG. 5, the sync preamble detector 351 of FIG. 6, one or more devices configured to generate the first flag and the first measure (e.g., a processor executing instructions at a non-transitory computer readable storage medium), or any combination thereof.

The apparatus further includes means for generating an inverted signal based on the signal. For example, the means for generating the inverted signal based on the signal may include the second sync preamble detector 402 of FIG. 5, the sync preamble detector 351 of FIG. 6, one or more devices configured to generate the inverted signal based on the signal (e.g., a processor executing instructions at a non-transitory computer readable storage medium), or any combination thereof.

The apparatus also includes means for generating a second flag and a second measure. The second flag may indicate whether the synchronization preamble is detected in the inverted signal. The second measure may be generated by aggregating correlation peaks that correspond to the inverted signal. For example, the means for generating the second flag and the second measure may include the second sync preamble detector 402 of FIG. 5, the sync preamble detector 351 of FIG. 6, one or more devices configured to generate the second flag and the second measure (e.g., a processor executing instructions at a non-transitory computer readable storage medium), or any combination thereof.

The apparatus further includes means for generating an invert flag indicating whether codec inversion is detected in the signal based at least in part on the first flag, the second flag, the first measure, and the second measure. For example, the means for generating the invert flag may include the inversion detector 403 of FIG. 5, one or more devices configured to generate the invert flag based at least in part on the first flag, the second flag, the first measure, and the second measure (e.g., a processor executing instructions at a non-transitory computer readable storage medium), or any combination thereof.

Further in conjunction with the described aspects, an apparatus is disclosed that includes means for receiving a signal. For example, the means for receiving the signal may include the receiver 495 of FIG. 1, one or more devices configured to receive the signal (e.g., a processor executing instructions at a non-transitory computer readable storage medium), or any combination thereof.

The apparatus also includes means for generating an invert flag indicating whether synchronization inversion is detected in the signal based at least in part on a first flag, a second flag, a first value of a first synchronization sign indicator associated with the signal, and a second value of a second synchronization sign indicator associated with an inverted signal. For example, the means for generating the invert flag may include the sync detector and Rx control 350 of FIG. 1, the Sync Preamble and Inversion Detector 355 of FIG. 4, the inversion detector 403 of FIG. 5, one or more devices configured to generate the invert flag based at least in part on the first flag, the second flag, the first value, and the second value (e.g., a processor executing instructions at a non-transitory computer readable storage medium), or any combination thereof.

The first flag (e.g., the SyncPosFlag S405) may indicate whether the signal (e.g., the vocoder decoder output S370) satisfies one or more first conditions, as described with reference to FIG. 6. The one or more first conditions may be based on a first number of detected correlation peaks associated with the signal, a first correlation peak amplitude, or both. For example, the Sync Preamble Detector 351 may determine whether the number of peaks detected is a majority of peaks of an expected pattern, as described with reference to FIG. 6. As another example, the Sync Preamble Detector 351 may determine whether amplitudes of positive peaks satisfy a particular amplitude threshold (e.g., PeakAmpT1), whether amplitudes of negative peaks satisfy a particular amplitude threshold (e.g., PeakAmpT2), or both, as described with reference to FIG. 6. The second flag (e.g., the SyncNegFlag S410) may indicate whether the inverted signal (e.g., an inverted version of the vocoder decoder output S370) satisfies one or more second conditions, as described with reference to FIG. 6. The one or more second conditions may be based on a second number of detected correlation peaks associated with the inverted signal, a second correlation peak amplitude, or both, as described with reference to FIG. 6.

Those of skill would further appreciate that the various illustrative logical blocks, configurations, modules, circuits, and algorithm steps described in connection with the examples disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the examples disclosed herein may be embodied directly in hardware, in a software module executed by a processor, or in a combination of the two. A software module may reside in a memory device, such as RAM, MRAM, STT-MRAM, flash memory, ROM, PROM, EPROM, EEPROM, registers, hard disk, a removable disk, or a CD-ROM. An exemplary memory device is coupled to the processor such that the processor can read information from, and write information to, the memory device. In the alternative, the memory device may be integral to the processor. The processor and the storage medium may reside in an ASIC. The ASIC may reside in a computing device or a user terminal. In the alternative, the processor and the storage medium may reside as discrete components in a computing device or a user terminal.

The previous description of the disclosed examples is provided to enable a person skilled in the art to make or use the disclosed examples. Various modifications to these examples will be readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. A device comprising:
    a receiver configured to receive a signal; and
    a processor configured to:
        generate a first flag indicating whether the signal satisfies one or more first conditions, wherein the one or more first conditions are based on a first number of detected correlation peaks associated with the signal, a first correlation peak amplitude, or both;
        generate a first value of a first synchronization sign indicator associated with the signal;
        generate a second flag indicating whether an inverted signal satisfies one or more second conditions, wherein the one or more second conditions are based on a second number of detected correlation peaks associated with the inverted signal, a second correlation peak amplitude, or both;
        generate a second value of a second synchronization sign indicator associated with the inverted signal; and
        generate an invert flag that indicates whether synchronization inversion is detected in the signal based at least in part on the first flag, the second flag, the first value, and the second value.

2. The device of claim 1, wherein the processor is further configured to generate the invert flag indicating that synchronization inversion is detected in response to:
    determining that the first flag indicates that the signal satisfies the one or more first conditions;
    determining that the second flag indicates that the inverted signal satisfies the one or more second conditions;
    determining that the second number is greater than or equal to four or determining that the second number is greater than or equal to three and that the first number is positive;
    determining that the first value is less than the second value;
    determining that the first value is less than or equal to zero; and
    determining that the second value is positive.

3. The device of claim 1, wherein the processor is further configured to generate the invert flag indicating that synchronization inversion is not detected in response to:
    determining that the first flag indicates that the signal satisfies the one or more first conditions,
    determining that the first number is greater than or equal to four,
    determining that the first value is positive, and
    determining that the first value is greater than the second value and that the second value is less than or equal to zero or determining that the second flag indicates that the inverted signal fails to satisfy the one or more second conditions.

4. The device of claim 1, wherein the processor is further configured to generate the invert flag indicating that synchronization inversion is not detected in response to:
    determining that the first flag indicates that the signal satisfies the one or more first conditions,
    determining that the first number is greater than or equal to three,
    determining that the second number is positive or determining that the second flag indicates that the inverted signal fails to satisfy the one or more second conditions,
    determining that the first value is positive, and
    determining that the first value is greater than the second value and that the second value is less than or equal to zero or determining that the second flag indicates the inverted signal fails to satisfy the one or more second conditions.

5. The device of claim 1, wherein the processor is further configured to generate the invert flag indicating that synchronization inversion is detected in response to:
    determining that the first flag indicates that the signal fails to satisfy the one or more first conditions,
    determining that the second flag indicates that the inverted signal satisfies the one or more second conditions,
    determining that the second number is greater than or equal to four or determining that the second number is greater than or equal to three and that the first number is positive, and
    determining that the second value is positive.

6. The device of claim 1, wherein the inverted signal is based on the signal, and wherein the receiver is configured to receive the signal from an in-vehicle emergency call (eCall) system or from a public safety answering point (PSAP).

7. The device of claim 1, wherein the receiver and the processor are included in a public safety answering point (PSAP), an in-vehicle emergency call (eCall) system, or both.

8. A method comprising:
    receiving a signal at a device; and
    generating, at the device, an invert flag indicating whether synchronization inversion is detected in the signal based at least in part on a first flag, a second flag, a first value of a first synchronization sign indicator associated with the signal, and a second value of a second synchronization sign indicator associated with an inverted signal, wherein the first flag indicates whether the signal satisfies one or more first conditions, wherein the one or more first conditions are based on a first number of detected correlation peaks associated with the signal, a first correlation peak amplitude, or both, wherein the second flag indicates whether the inverted signal satisfies one or more second conditions, and wherein the one or more second conditions are based on a second number of detected correlation peaks associated with the inverted signal, a second correlation peak amplitude, or both.

9. The method of claim 8, wherein the signal is received from an in-vehicle emergency call (eCall) system or from a public safety answering point (P SAP).

10. The method of claim 8, wherein the device is included in a public safety answering point (P SAP), an in-vehicle emergency call (eCall) system, or both.

11. A computer-readable storage device storing instructions that, when executed by a processor, cause the processor to perform operations comprising:

receiving a signal at a device; and generating, at the device, an invert flag indicating whether synchronization inversion is detected in the signal based at least in part on a first flag, a second flag, a first value of a first synchronization sign indicator associated with the signal, and a second value of a second synchronization sign indicator associated with an inverted signal, wherein the first flag indicates whether the signal satisfies one or more first conditions, wherein the one or more first conditions are based on a first number of detected correlation peaks associated with the signal, a first correlation peak amplitude, or both, wherein the second flag indicates whether the inverted signal satisfies one or more second conditions, and wherein the one or more second conditions are based on a second number of detected correlation peaks associated with the inverted signal, a second correlation peak amplitude, or both.

12. The computer-readable storage device of claim 11, wherein the signal is received from an in-vehicle emergency call (eCall) system or from a public safety answering point (PSAP).

13. The computer-readable storage device of claim 11, wherein the processor is included in a public safety answering point (PSAP), an in-vehicle emergency call (eCall) system, or both.

14. An apparatus comprising:

means for receiving a signal; and means for generating an invert flag indicating whether synchronization inversion is detected in the signal based at least in part on a first flag, a second flag, a first value of a first synchronization sign indicator associated with the signal, and a second value of a second synchronization sign indicator associated with an inverted signal, wherein the first flag indicates whether the signal satisfies one or more first conditions, wherein the one or more first conditions are based on a first number of detected correlation peaks associated with the signal, a first correlation peak amplitude, or both, wherein the second flag indicates whether the inverted signal satisfies one or more second conditions, and wherein the one or more second conditions are based on a second number of detected correlation peaks associated with the inverted signal, a second correlation peak amplitude, or both.

15. The apparatus of claim 14, wherein the signal is received from an in-vehicle emergency call (eCall) system or from a public safety answering point (P SAP).

16. The apparatus of claim 14, wherein the means for receiving and the means for generating are included in a public safety answering point (P SAP), an in-vehicle emergency call (eCall) system, or both.

17. A device comprising:

a receiver configured to receive a signal;

a first synchronization preamble detector configured to:
generate a first flag indicating whether a synchronization preamble is detected in the signal; and
generate a first measure by aggregating correlation peaks that correspond to the signal;

a second synchronization preamble detector configured to:
generate an inverted signal based on the signal;
generate a second flag indicating whether the synchronization preamble is detected in the inverted signal; and
generate a second measure by aggregating correlation peaks that correspond to the inverted signal; and a codec inversion detector configured to generate an invert flag that indicates whether codec inversion is detected in the signal based at least in part on the first flag, the second flag, the first measure, and the second measure.

18. The device of claim 17, wherein the first synchronization preamble detector is further configured to generate a first number of correlation peaks corresponding to the signal, wherein the second synchronization preamble detector is further configured to generate a second number of correlation peaks corresponding to the inverted signal, and wherein the codec inversion detector is configured to generate the invert flag based at least in part on the first number and the second number.

19. The device of claim 18, wherein the codec inversion detector is configured to generate the invert flag indicating that the codec inversion is detected in response to:

determining that the first flag indicates that the synchronization preamble is detected in the signal, determining that the second flag indicates that the synchronization preamble is detected in the inverted signal, determining that the second number is greater than or equal to four or determining that the second number is greater than or equal to three and that the first number is positive, determining that the first measure is less than the second measure, determining that the first measure is less than or equal to zero, and determining that the second measure is positive.

20. The device of claim 18, wherein the codec inversion detector is configured to generate the invert flag indicating that the codec inversion is not detected in response to:

determining that the first flag indicates that the synchronization preamble is detected in the signal, determining that the first number is greater than or equal to four, determining that the first measure is positive, and determining that the first measure is greater than the second measure and that the second measure is less than or equal to zero or determining that the second flag indicates that the synchronization preamble is not detected in the inverted signal.

21. The device of claim 18, wherein the codec inversion detector is configured to generate the invert flag indicating that the codec inversion is not detected in response to:
   determining that the first flag indicates that the synchronization preamble is detected in the signal,
   determining that the first number is greater than or equal to three,
   determining that the second number is positive or determining that the second flag indicates that the synchronization preamble is not detected in the inverted signal,
   determining that the first measure is positive, and
   determining that the first measure is greater than the second measure and that the second measure is less than or equal to zero or determining that the second flag indicates that the synchronization preamble is not detected in the inverted signal.

22. The device of claim 18, wherein the codec inversion detector is configured to generate the invert flag indicating that the codec inversion is detected in response to:
   determining that the first flag indicates that the synchronization preamble is not detected in the signal,
   determining that the second flag indicates that the synchronization preamble is detected in the inverted signal,
   determining that the second number is greater than or equal to four or determining that the second number is greater than or equal to three and that the first number is positive, and
   determining that the second measure is positive.

23. The device of claim 18, wherein the codec inversion detector is further configured to generate a sync flag indicating whether the synchronization preamble is detected, wherein the sync flag is based on the first flag, the second flag, the first measure, the second measure, the first number, and the second number.

24. The device of claim 17, wherein the signal is received from an in-vehicle emergency call (eCall) system or from a public safety answering point (P SAP).

25. The device of claim 17, wherein the receiver, the first synchronization preamble detector, the second synchronization preamble detector, and the codec inversion detector are included in a public safety answering point (PSAP), an in-vehicle emergency call (eCall) system, or both.

26. A method comprising:
   receiving a signal at a device; and
   generating, at the device, an invert flag indicating whether codec inversion is detected in the signal based at least in part on a first flag, a second flag, a first measure, and a second measure,
   wherein the first flag indicates whether a synchronization preamble is detected in the signal,
   wherein the first measure is based on a first aggregate of correlation peaks corresponding to the signal,
   wherein the second flag indicates whether the synchronization preamble is detected in an inverted signal,
   wherein the inverted signal is based on the signal, and
   wherein the second measure is based on a second aggregate of correlation peaks corresponding to the inverted signal.

27. The method of claim 26, wherein the invert flag is based at least in part on a first number of correlation peaks corresponding to the signal and a second number of correlation peaks corresponding to the inverted signal.

28. The method of claim 27, further comprising detecting the codec inversion in response to:
   determining that the first flag indicates that the synchronization preamble is detected in the signal,
   determining that the second flag indicates that the synchronization preamble is detected in the inverted signal,
   determining that the second number is greater than or equal to four or determining that the second number is greater than or equal to three and that the first number is positive,
   determining that the first measure is less than or equal to zero, and
   determining that the second measure is positive.

29. The method of claim 27, further comprising determining that the codec inversion is not detected in response to:
   determining that the first flag indicates that the synchronization preamble is detected in the signal,
   determining that the first number is greater than or equal to four,
   determining that the first measure is positive, and
   determining that the first measure is greater than the second measure and that the second measure is less than or equal to zero or determining that the second flag indicates that the synchronization preamble is not detected in the inverted signal.

30. The method of claim 27, further comprising determining that the codec inversion is not detected in response to:
   determining that the first flag indicates that the synchronization preamble is detected in the signal,
   determining that the first number is greater than or equal to three,
   determining that the second number is positive or determining that the second flag indicates that the synchronization preamble is not detected in the inverted signal,
   determining that the first measure is positive, and
   determining that the first measure is greater than the second measure and that the second measure is less than or equal to zero or determining that the second flag indicates that the synchronization preamble is not detected in the inverted signal.

31. The method of claim 27, further comprising determining that the codec inversion is detected in response to:
   determining that the first flag indicates that the synchronization preamble is not detected in the signal,
   determining that the second flag indicates that the synchronization preamble is detected in the inverted signal,
   determining that the second number is greater than or equal to four or determining that the second number is greater than or equal to three and that the first number is positive, and
   determining that the second measure is positive.

32. The method of claim 26, wherein the signal is received from an in-vehicle emergency call (eCall) system or from a public safety answering point (PSAP).

33. The method of claim 26, wherein the device is included in a public safety answering point (P SAP), an in-vehicle emergency call (eCall) system, or both.

34. An apparatus comprising:
   means for receiving a signal;
   means for generating a first flag and a first measure, wherein the first flag indicates whether a synchronization preamble is detected in the signal and wherein the first measure is generated by aggregating correlation peaks that correspond to the signal;

means for generating an inverted signal based on the signal;

means for generating a second flag and a second measure, wherein the second flag indicates whether the synchronization preamble is detected in the inverted signal and wherein the second measure is generated by aggregating correlation peaks that correspond to the inverted signal; and means for generating an invert flag indicating whether codec inversion is detected in the signal based at least in part on the first flag, the second flag, the first measure, and the second measure.

35. The apparatus of claim 34, wherein the signal is received from an in-vehicle emergency call (eCall) system or from a public safety answering point (PSAP).

36. The apparatus of claim 34, wherein the means for receiving, the means for generating the first flag and the first measure, the means for generating the inverted signal, the means for generating the second flag and the second measure, and the means for generating the invert flag are included in a public safety answering point (PSAP), an in-vehicle emergency call (eCall) system, or both.

37. A computer-readable storage device storing instructions that, when executed by a processor, cause the processor to perform operations comprising:

receiving a signal; and generating an invert flag indicating whether codec inversion is detected in the signal based at least in part on a first flag, a second flag, a first measure, and a second measure, wherein the first flag indicates whether a synchronization preamble is detected in the signal, wherein the first measure is based on a first aggregate of correlation peaks corresponding to the signal, wherein the second flag indicates whether the synchronization preamble is detected in an inverted signal, wherein the inverted signal is based on the signal, and wherein the second measure is based on a second aggregate of correlation peaks corresponding to the inverted signal.

38. The computer-readable storage device of claim 37, wherein the signal is received from an in-vehicle emergency call (eCall) system or from a public safety answering point (PSAP).

39. The computer-readable storage device of claim 37, wherein the invert flag is based at least in part on a first number of correlation peaks corresponding to the signal and a second number of correlation peaks corresponding to the inverted signal.

40. The computer-readable storage device of claim 37, wherein the processor is included in a public safety answering point (PSAP), an in-vehicle emergency call (eCall) system, or both.

* * * * *